US 10,372,912 B2

(12) United States Patent
Grafi et al.

(10) Patent No.: US 10,372,912 B2
(45) Date of Patent: *Aug. 6, 2019

(54) SYSTEM AND METHOD FOR DISARMING MALICIOUS CODE

(71) Applicant: VOTIRO CYBERSEC LTD., Tel-Aviv (IL)

(72) Inventors: Aviv Grafi, Ramat Gan (IL); Itay Glick, Haifa (IL)

(73) Assignee: VOTIRO CYBERSEC LTD., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,991

(22) Filed: Jul. 2, 2018

(65) Prior Publication Data

US 2018/0330090 A1 Nov. 15, 2018

Related U.S. Application Data

(63) Continuation of application No. 15/441,860, filed on Feb. 24, 2017, now Pat. No. 10,013,557.

(Continued)

(51) Int. Cl.
  *G06F 21/00* (2013.01)
  *G06F 21/56* (2013.01)
  *H04L 29/06* (2006.01)

(52) U.S. Cl.
  CPC .......... *G06F 21/566* (2013.01); *H04L 63/145* (2013.01); *H04L 63/1408* (2013.01); *H04L 63/1466* (2013.01); *G06F 2221/034* (2013.01)

(58) Field of Classification Search
  CPC .......... G06F 21/31; G06F 21/35; G06F 21/42
  See application file for complete search history.

(56) References Cited

U.S. PATENT DOCUMENTS

| 4,654,484 A | 3/1987 | Reiffel et al. |
| 5,164,839 A | 11/1992 | Lang |

(Continued)

FOREIGN PATENT DOCUMENTS

WO WO 2011014623 2/2011

OTHER PUBLICATIONS

"Building a Decoder for the CVE-2014-0502 Shellcode", Volatility Labs, https://volatility-labs.blogspot.co.il/2014/building-decoder-for-cve-2014-0502.html (Apr. 8, 2014).

(Continued)

*Primary Examiner* — Brandon S Hoffman
*Assistant Examiner* — Thong P Truong
(74) *Attorney, Agent, or Firm* — Finnegan, Henderson, Farabow, Garrett & Dunner, LLP

(57) ABSTRACT

The disclosed embodiments include a method for disarming malicious code in a computer system having a processor. The method comprises accessing, by the computer system, input content, wherein the input content includes a plurality of data units having a value representing media content, and adjusting, by the processor, a data unit value of at least a portion of the data units, wherein the portion of the data units and an adjustment of the data unit value are determined so as to render any malicious code included in the plurality of data units inactive for its intended malicious purpose while not interfering with an intended use of the input content.

21 Claims, 8 Drawing Sheets

Related U.S. Application Data

(60) Provisional application No. 62/442,452, filed on Jan. 5, 2017.

(56) References Cited

U.S. PATENT DOCUMENTS

| | | | |
|---|---|---|---|
| 6,324,334 | B1 | 11/2001 | Morioka et al. |
| 7,185,017 | B1 | 2/2007 | Cauvin et al. |
| 7,263,561 | B1 | 8/2007 | Green et al. |
| 7,797,743 | B2 | 9/2010 | Treacy et al. |
| 8,180,837 | B2 | 5/2012 | Lu et al. |
| 8,185,954 | B2 | 5/2012 | Scales |
| 8,239,950 | B1* | 8/2012 | Huang ................ G06F 21/564 726/24 |
| 8,316,459 | B2 | 11/2012 | Shani |
| 8,533,824 | B2 | 9/2013 | Hutton et al. |
| 8,745,742 | B1 | 6/2014 | Satish et al. |
| 8,763,128 | B2 | 6/2014 | Lim et al. |
| 8,869,283 | B2 | 10/2014 | Scales |
| 9,038,174 | B2 | 5/2015 | Hutton et al. |
| 9,047,293 | B2 | 6/2015 | Grafi et al. |
| 9,330,264 | B1 | 5/2016 | Hutton |
| 9,515,045 | B2 | 12/2016 | Scales |
| 2003/0229810 | A1 | 12/2003 | Bango |
| 2005/0257045 | A1 | 11/2005 | Bushman et al. |
| 2007/0056035 | A1 | 3/2007 | Copley |
| 2007/0087766 | A1 | 4/2007 | Hardy et al. |
| 2007/0168285 | A1* | 7/2007 | Girtakovskis ........ G06Q 10/107 705/50 |
| 2008/0209551 | A1 | 8/2008 | Treacy et al. |
| 2009/0138972 | A1 | 5/2009 | Scales |
| 2009/0150419 | A1 | 6/2009 | Kim et al. |
| 2009/0282484 | A1 | 11/2009 | Wiseman et al. |
| 2010/0115620 | A1 | 5/2010 | Alme |
| 2010/0154063 | A1 | 6/2010 | Hutton et al. |
| 2012/0167206 | A1 | 6/2012 | Reetz-Lamour et al. |
| 2012/0278894 | A1 | 11/2012 | Scales et al. |
| 2013/0081065 | A1 | 3/2013 | Sharan et al. |
| 2013/0326624 | A1 | 12/2013 | Hutton et al. |
| 2016/0173506 | A1* | 6/2016 | Bank ....................... H04L 63/14 726/23 |
| 2016/0191531 | A1 | 6/2016 | Perlmutter et al. |

OTHER PUBLICATIONS

"Dissecting the Newest IE10 0-day Exploit (CVE-2014-0322)" by Vadim Kotov, Bromium Labs, https://labs.bromium.com/2014/02/25/dissecting-the-newest-ie10-0-day-exploit-cve-2014/0322/ (Feb. 25, 2014).

An Analysis of Windows Zero-Day Vulnerability 'CVE-2014-4114' aka "Sandworm", TrendLabs Security Intelligence Blog, http://blog.trendmicro.com/trendlabs-security-intelligence/an-analysis-of-windows-zero-day-vulnerability-cve-2014-4114-aka-sandworm, posted Oct. 14, 2014.

Lanjia Wang et al., "Thwarting Zero-Day Polymorphic Worms With Network-Level Length-Based Signature Generation", Feb. 2010, IEEE/ACM Transactions on Networking, vol. 18, No. 1, pp. 53-66.

"A Different Exploit Angle on Adobe's Recent Zero-Day" by Dan Caselden et al., (Jan. 2015) https://www_fireeye.com/blog/threat-research/2015/01/a_different_expolit.html.

"Advanced Heap Spraying Techniques", Recognize-Security, Security by Moshe Ben Abu (Jan. 2010) https://www.owasp.org/images/0/01/OWASL_IL_2010_Jan—Moshe_Ben_Abu—Advanced_Heapspray.pdf.

"Punk Ode Hiding Shellcode in Plain Sight" by Greg McManus et al., https://www.blackhat.com/presentations/bh-usa-06/BH-US-06-Sutton.pdf (accessed Aug. 14, 2016).

National Security Agency, "Hidden Data and Metadata in Adobe PDF Files: Publication Risks and Countermeasures" (Jul. 27, 2008).

U.S. Appl. No. 15/441,904 to Aviv Grafi et al. entitled "System and Method for Protecting Systems from Malicious Attacks" filed Feb. 24, 2017.

YazamTech, captured on Aug. 22, 2010, https://web.archive.org/web/20100822155839/http://yazamtech.com:80/en, 3 pages.

Products, YazamTech, captured on Aug. 23, 2010, https://web.archive.org/web/20100823005723/http://yazamtech.com:80/en/products, 3 pages.

YazamTech, captured on Oct. 7, 2010, https://web.archive.org/web/20101007160034/http://yazamtech.com:80/en?phpMyAdmin=2pTp23a-YBGPpnaPAXvSkgjFO71, 2 pages.

ShuttleIT, YazamTech, captured on Dec. 29, 2010, https://web.archive.org/web/20101229174141/http://yazamtech.com:80/en/shuttleit, 3 pages.

About Us, YazamTech, captured on Dec. 31, 2010, https://web.archive.org/web/20101231084709/http://yazamtech.com:80/en/about-us, 2 pages.

Contact Us, YazamTech, captured on Dec. 31, 2010, https://web.archive.org/web/20101231084713/http://yazamtech.com:80/en/contact, 1 page.

Distributors, YazamTech, captured on Dec. 31, 2010, https://web.archive.org/web/20101231123316/http://yazamtech.com:80/en/distributor_en, 2 pages.

Docs, YazamTech, captured on Dec. 31, 2010, https://web.archive.org/web/20101231123319/http://yazamtech.com:80/en/docs, 1 page.

Documentation, YazamTech, captured on Dec. 31, 2010, https://web.archive.org/web/20101231123344/http://yazamtech.com:80/en/documentation, 1 page.

InjectorIT, YazamTech, captured on Dec. 31, 2010, https://web.archive.org/web/20101231123352/http://yazamtech.com:80/en/injectorit, 2 pages.

Products, YazamTech, captured on Dec. 31, 2010, https://web.archive.org/web/20101231084723/http://yazamtech.com:80/en/products, 2 pages.

Research, YazamTech, captured on Dec. 31, 2010, https://web.archive.org/web/20101231123359/http://yazamtech.com:80/en/research, 1 page.

SelectorIT, YazamTech, captured on Dec. 31, 2010, https://web.archive.org/web/20101231084740/http://yazamtech.com:80/en/selectorit, 4 pages.

YazamTech, captured on Dec. 31, 2010, https://web.archive.org/web/20101231084707/http://yazamtech.com:80/en , 2 pages.

ShuttleIT, YazamTech, captured on Feb. 3, 2011, https://web.archive.org/web/20110203153113/http://yazamtech.com:80/en/shuttleit, 3 pages.

YazamTech, captured on Mar. 6, 2011, https://web.archive.org/web/20110306123449/http://yazamtech.com:80/en, 2 pages.

Products, YazamTech, captured on Mar. 15, 2011, https://web.archive.org/web/20110315193104/http://yazamtech.com:80/en/products, 2 pages.

Research, YazamTech, captured on Mar. 15, 2011, https://web.archive.org/web/20110315193112/http://yazamtech.com:80/en/research, 1 page.

White-listing Beyond Anti-Virus, YazamTech, captured on Mar. 15, 2011, https://web.archive.org/web/20110315175925/http://yazamtech.com:80/en/white-listing-beyond-anti-virus, 1 page.

White-listing Server or Station, YazamTech, captured on Mar. 15, 2011, https://web.archive.org/web/20110315193118/http://yazamtech.com:80/en/white-listing-server-or-station, 1 page.

YazamTech, captured on Mar. 15, 2011, https://web.archive.org/web/20110315193058/http://yazamtech.com/en, 2 pages.

A single ShuttleIT system can now handle multiple directories, YazamTech, captured on Sep. 27, 2013, https://web.archive.org/web/20130927194536/http://yazamtech.com/en/single-shuttleit-system-can-now-handle-multiple-directories, 1 page.

About Us, YazamTech, captured on Sep. 27, 2013, https://web.archive.org/web/20130927194226/http://yazamtech.com/en/about-us, 3 pages.

ActualIT, YazamTech, captured on Sep. 27, 2013, https://web.archive.org/web/20130927194433/http://yazamtech.com/en/actualit, 2 pages.

ActualIT, YazamTech, captured on Sep. 27, 2013, https://web.archive.org/web/20130927195119/http://yazamtech.com/en/actualit-1, 1 page.

Contact Us, YazamTech, captured on Sep. 27, 2013, https://web.archive.org/web/20130927194337/http://yazamtech.com/en/contact, 1 page.

(56) References Cited

OTHER PUBLICATIONS

Distributors, YazamTech, captured on Sep. 27, 2013, https://web.archive.org/web/20130927195025/http://yazamtech.com/en/distributor_en, 1 page.
Docs, YazamTech, captured on Sep. 27, 2013, https://web.archive.org/web/20130927194307/http://yazamtech.com/en/docs, 1 page.
File Slack, YazamTech, captured on Sep. 27, 2013, https://web.archive.org/web/20130927195132/http://yazamtech.com/en/file-slack, 1 page.
Frequently Asked Questions—English, YazamTech, captured on Sep. 27, 2013, https://web.archive.org/web/20130927195242/http://yazamtech.com/en/category/faq/english, 2 pages.
Frequently Asked Questions—English, YazamTech, captured on Sep. 27, 2013, https://web.archive.org/web/20130927195230/http://yazamtech.com/en/faq/english, 3 pages.
Frequently Asked Questions, YazamTech, captured on Sep. 27, 2013, https://web.archive.org/web/20130927195218/http://yazamtech.com/en/faq, 3 pages.
InjectorIT allows the usage of a secure server, YazamTech, captured on Sep. 27, 2013, https://web.archive.org/web/20130927194459/http://yazamtech.com/en/injectorit-allows-usage-secure-server, 1 page.
New Features in SelectorIT 1.1.0, YazamTech, captured on Sep. 27, 2013, https://web.archive.org/web/20130927194511/http://yazamtech.com/en/new-features-selectorit-110, 1 page.
Products, YazamTech, captured on Sep. 27, 2013, https://web.archive.org/web/20130927194241/http://yazamtech.com/en/products, 1 page.
Research, YazamTech, captured on Sep. 27, 2013, https://web.archive.org/web/20130927194321/http://yazamtech.com/en/research, 1 page.
SelectorIT, YazamTech, captured on Sep. 27, 2013, https://web.archive.org/web/20130927195041/http://yazamtech.com/en/selectorit-0, 1 page.
SelectorIT, YazamTech, captured on Sep. 27, 2013, https://web.archive.org/web/20130927194123/http://yazamtech.com/en/selectorit, 4 pages.
SelectorIT, YazamTech, captured on Sep. 27, 2013, https://web.archive.org/web/20130927195012/http://yazamtech.com/en/selectorit?phpMyAdmin=2pTp23a-YBGPpnaPAXvSkgjFO71, 4 pages.
SelectorIT: a security solution beyond anti-virus, YazamTech, captured on Sep. 27, 2013, https://web.archive.org/web/20130927194524/http://yazamtech.com/en/selectorit-security-solution-beyond-anti-virus, 1 page.
ShuttleIT, YazamTech, captured on Sep. 27, 2013, https://web.archive.org/web/20130927195054/http://yazamtech.com/en/node/37, 1 page.
ShuttleIT, YazamTech, captured on Sep. 27, 2013, https://web.archive.org/web/20130927194354/http://yazamtech.com/en/node/9, 4 pages.
Updates, YazamTech, captured on Sep. 27, 2013, https://web.archive.org/web/20130927194253/http://yazamtech.com/en/updates_en, 1 page.
VectorIT, YazamTech, captured on Sep. 27, 2013, https://web.archive.org/web/20130927195108/http://yazamtech.com/en/injectorit-0, 1 page.
VectorIT, YazamTech, captured on Sep. 27, 2013, https://web.archive.org/web/20130927194948/http://yazamtech.com/en/vectorit, 3 pages.
White-listing Beyond Anti-Virus, YazamTech, captured on Sep. 27, 2013, https://web.archive.org/web/20130927195143/http://yazamtech.com/en/white-listing-beyond-anti-virus, 1 page.
White-listing Server or Station, YazamTech, captured on Sep. 27, 2013, https://web.archive.org/web/20130927195155/http://yazamtech.com/en/white-listing-server-or-station, 1 page.
YazamTech, captured on Sep. 27, 2013, https://web.archive.org/web/20130927193714/http://yazamtech.com/en, 2 pages.
Zip Bomb, YazamTech, captured on Sep. 27, 2013, https://web.archive.org/web/20130927195206/http://yazamtech.com/en/zip-bomb, 1 page.
YazamTech, captured on Jan. 7, 2014, https://web.archive.org/web/20140107212727/http://yazamtech.com/en, 2 pages.
YazamTech, captured on Jan. 11, 2014, https://web.archive.org/web/20140111182504/http://yazamtech.com/en, 2 pages.
About Us, YazamTech, captured on Jan. 24, 2014, https://web.archive.org/web/20140124145938/http://yazamtech.com/en/about-us, 3 pages.
Distributors, YazamTech, captured on Jan. 24, 2014, https://web.archive.org/web/20140124145954/http://yazamtech.com/en/distributor_en, 1 page.
VectorIT, YazamTech, captured on Jan. 25, 2014, https://web.archive.org/web/20140125221917/http://yazamtech.com/en/vectorit, 3 pages.
YazamTech, captured on Jan. 25, 2014, https://web.archive.org/web/20140125161656/http://yazamtech.com/en, 2 pages.
Contact Us, YazamTech, captured on Jan. 27, 2014, https://web.archive.org/web/20140127013125/http://yazamtech.com/en/contact, 1 page.
Docs, YazamTech, captured on Jan. 27, 2014, https://web.archive.org/web/20140127013132/http://yazamtech.com/en/docs, 1 page.
Research, YazamTech, captured on Jan. 27, 2014, https://web.archive.org/web/20140127013151/http://yazamtech.com/en/research, 1 page.
Updates, YazamTech, captured on Jan. 27, 2014, https://web.archive.org/web/20140127013214/http://yazamtech.com/en/updates_en, 1 page.
A single ShuttleIT system can now handle multiple directories, YazamTech, captured on Aug. 1, 2014, https://web.archive.org/web/20140801204953/http://yazamtech.com/en/single-shuttleit-system-can-now-handle-multiple-directories, 1 page.
About Us, YazamTech, captured on Aug. 1, 2014, https://web.archive.org/web/20140801204634/http://yazamtech.com/en/about-us, 3 pages.
ActualIT, YazamTech, captured on Aug. 1, 2014, https://web.archive.org/web/20140801204843/http://yazamtech.com/en/actualit, 2 pages.
ActualIT, YazamTech, captured on Aug. 1, 2014, https://web.archive.org/web/20140801205619/http://yazamtech.com/en/actualit-1, 1 page.
Contact Us, YazamTech, captured on Aug. 1, 2014, https://web.archive.org/web/20140801204744/http://yazamtech.com/en/contact, 1 page.
Distributors, YazamTech, captured on Aug. 1, 2014, https://web.archive.org/web/20140801205513/http://yazamtech.com/en/distributor_en, 1 page.
Docs, YazamTech, captured on Aug. 1, 2014, https://web.archive.org/web/20140801204715/http://yazamtech.com/en/docs, 1 page.
File Slack, YazamTech, captured on Aug. 1, 2014, https://web.archive.org/web/20140801205632/http://yazamtech.com/en/file-slack, 1 page.
Frequently Asked Questions—English, YazamTech, captured on Aug. 1, 2014, https://web.archive.org/web/20140801205754/http://yazamtech.com/en/category/faq/english, 2 pages.
Frequently Asked Questions—English, YazamTech, captured on Aug. 1, 2014, https://web.archive.org/web/20140801205740/http://yazamtech.com/en/faq/english, 3 pages.
Frequently Asked Questions, YazamTech, captured on Aug. 1, 2014, https://web.archive.org/web/20140801205726/http://yazamtech.com/en/faq, 3 pages.
InjectorIT allows the usage of a secure server, YazamTech, captured on Aug. 1, 2014, https://web.archive.org/web/20140801204911/http://yazamtech.com/en/injectorit-allows-usage-secure-server, 1 page.
New Features in SelectorIT 1.1.0, YazamTech, captured on Aug. 1, 2014, https://web.archive.org/web/20140801204925/http://yazamtech.com/en/new-features-selectorit-110, 1 page.
Products, YazamTech, captured on Aug. 1, 2014, https://web.archive.org/web/20140801204646/http://yazamtech.com/en/products, 1 page.
Research, YazamTech, captured on Aug. 1, 2014, https://web.archive.org/web/20140801204731/http://yazamtech.com/en/research, 1 page.
SelectorIT, YazamTech, captured on Aug. 1, 2014, https://web.archive.org/web/20140801204521/http://yazamtech.com/en/selectorit, 4 pages.
SelectorIT, YazamTech, captured on Aug. 1, 2014, https://web.archive.org/web/20140801205500/http://yazamtech.com/en/selectorit?phpMyAdmin=2pTp23a-YBGPpnaPAXvSkgjFO71, 4 pages.
SelectorIT, YazamTech, captured on Aug. 1, 2014, https://web.archive.org/web/20140801205537/http://yazamtech.com/en/selectorit-0, 1 page.
SelectorIT: a security solution beyond anti-virus, YazamTech, captured on Aug. 1, 2014, https://web.archive.org/web/20140801204940/http://yazamtech.com/en/selectorit-security-solution-beyond-anti-virus, 1 page.

(56) References Cited

OTHER PUBLICATIONS

ShuttleIT, YazamTech, captured on Aug. 1, 2014, https://web.archive.org/web/20140801205552/http://yazamtech.com/en/node/37, 1 page.
ShuttleIT, YazamTech, captured on Aug. 1, 2014, https://web.archive.org/web/20140801204802/http://yazamtech.com/en/node/9, 4 pages.
Updates, YazamTech, captured on Aug. 1, 2014, https://web.archive.org/web/20140801204702/http://yazamtech.com/en/updates_en, 1 page.
VectorIT, YazamTech, captured on Aug. 1, 2014, https://web.archive.org/web/20140801205606/http://yazamtech.com/en/injectorit-0, 1 page.
VectorIT, YazamTech, captured on Aug. 1, 2014, https://web.archive.org/web/20140801205431/http://yazamtech.com/en/vectorit, 3 pages.
White-listing Beyond Anti-Virus, YazamTech, captured on Aug. 1, 2014, https://web.archive.org/web/20140801205647/http://yazamtech.com/en/white-listing-beyond-anti-virus, 1 page.
White-listing Server or Station, YazamTech, captured on Aug. 1, 2014, https://web.archive.org/web/20140801205659/http://yazamtech.com/en/white-listing-server-or-station, 1 page.
YazamTech, captured on Aug. 1, 2014, https://web.archive.org/web/20140801204051/http://yazamtech.com/en, 2 pages.
Zip Bomb, YazamTech, captured on Aug. 1, 2014, https://web.archive.org/web/20140801205712/http://yazamtech.com/en/zip-bomb, 1 page.
YazamTech, captured on Mar. 20, 2015, https://web.archive.org/web/20150320024752/http://www.yazamtech.com:80/en, 2 pages.
A single ShuttleIT system can now handle multiple directories, YazamTech, captured on Mar. 21, 2015, https://web.archive.org/web/20150321022719/http://www.yazamtech.com:80/en/single-shuttleit-system-can-now-handle-multiple-directories, 1 page.
About Us, YazamTech, captured on Mar. 21, 2015, https://web.archive.org/web/20150321060726/http://www.yazamtech.com:80/en/about-us, 3 pages.
ActualIT, YazamTech, captured on Mar. 21, 2015, https://web.archive.org/web/20150321022658/http://www.yazamtech.com:80/en/actualit, 2 pages.
InjectorIT allows the usage of a secure server, YazamTech, captured on Mar. 21, 2015, https://web.archive.org/web/20150321022704/http://www.yazamtech.com:80/en/injectorit-allows-usage-secure-server, 1 page.
New Features in SelectorIT 1.1.0, YazamTech, captured on Mar. 21, 2015, https://web.archive.org/web/20150321022709/http://www.yazamtech.com:80/en/new-features-selectorit-110, 1 page.
SelectorIT, YazamTech, captured on Mar. 21, 2015, https://web.archive.org/web/20150321060700/http://www.yazamtech.com:80/en/selectorit, 4 pages.
SelectorIT: a security solution beyond anti-virus, YazamTech, captured on Mar. 21, 2015, https://web.archive.org/web/20150321022714/http://www.yazamtech.com:80/en/selectorit-security-solution-beyond-anti-virus, 1 page.
ShuttleIT, YazamTech, captured on Mar. 21, 2015, https://web.archive.org/web/20150321060625/http://www.yazamtech.com:80/en/node/9, 4 pages.
Updates, YazamTech, captured on Mar. 21, 2015, https://web.archive.org/web/20150321022726/http://www.yazamtech.com:80/en/updates_en, 1 page.
VectorIT, YazamTech, captured on Mar. 21, 2015, https://web.archive.org/web/20150321060706/http://www.yazamtech.com:80/en/vectorit, 3 pages.
YazamTech, captured on Mar. 21, 2015, https://web.archive.org/web/20150321060721/http://www.yazamtech.com:80/en, 2 pages.
YazamTech, captured on Apr. 6, 2015, https://web.archive.org/web/20150406175817/http://www.yazamtech.com:80/en, 2 pages.
YazamTech, captured on Apr. 23, 2015, https://web.archive.org/web/20150423110533/http://www.yazamtech.com:80/en, 2 pages.
Updates, YazamTech, captured on Jun. 28, 2015, https://web.archive.org/web/20150628122651/http://www.yazamtech.com:80/en/updates_en, 1 page.
YazamTech, captured on Jun. 28, 2015, https://web.archive.org/web/20150628122630/http://www.yazamtech.com:80/en, 2 pages.
Products, YazamTech, captured on Jul. 1, 2015, https://web.archive.org/web/20150701010841/http://www.yazamtech.com:80/en/products, 1 page.
SelectorIT, YazamTech, captured on Jul. 2, 2015, https://web.archive.org/web/20150702095314/http://www.yazamtech.com:80/en/selectorit-0, 1 page.
YazamTech, captured on Jul. 11, 2015, https://web.archive.org/web/20150711093404/http://www.yazamtech.com:80/en, 2 pages.
Additional Products, YazamTech, captured on Aug. 30, 2016, https://web.archive.org/web/20160830010641/http://www.yazamtech.com/#!additional-products/cy7, 2 pages.
Company, YazamTech, captured on Aug. 30, 2016, https://web.archive.org/web/20160830010641/http://www.yazamtech.com/#!company/hl4mz, 1 page.
Contact us, YazamTech, captured on Aug. 30, 2016, https://web.archive.org/web/20160830010641/http://www.yazamtech.com/#!contact/c24vq, 1 page.
Distributors, YazamTech, captured on Aug. 30, 2016, https://web.archive.org/web/20160830010641/http://www.yazamtech.com/#!distributors/cohj, 2 pages.
FAQ, YazamTech, captured on Aug. 30, 2016, https://web.archive.org/web/20160830010641/http://www.yazamtech.com/#!faq/cirw, 1 page.
Which actions can be expected from the content filtering system?, YazamTech, captured on Aug. 30, 2016, https://web.archive.org/web/20160830010641/http://www.yazamtech.com/#!faqs-11/c148p, 1 page.
What are the advantages of YazamTech SelectorIT?, YazamTech, captured on Aug. 30, 2016, https://web.archive.org/web/20160830010641/http://www.yazamtech.com/#!faqs-12/c18iv, 1 page.
What are the YazamTech values?, YazamTech, captured on Aug. 30, 2016, https://web.archive.org/web/20160830010641/http://www.yazamtech.com/#!faqs-14/cg8a, 1 page.
Who are the applicable customers for YazamTech products?, YazamTech, captured on Aug. 30, 2016, https://web.archive.org/web/20160830010641/http://www.yazamtech.com/#!faqs-15/c1xmc, 1 page.
Home, YazamTech, captured on Aug. 30, 2016, https://web.archive.org/web/20160830010641/http://www.yazamtech.com/, 2 pages.
YazamTech Updates, YazamTech, captured on Aug. 30, 2016, https://web.archive.org/web/20160830010641/http://www.yazamtech.com/#!new-post-updates-page/c1gp0, 4 pages.
Our Team, YazamTech, captured on Aug. 30, 2016, https://web.archive.org/web/20160830010641/http://www.yazamtech.com/#!our_team/cqn6, 2 pages.
Products, YazamTech, captured on Aug. 30, 2016, https://web.archive.org/web/20160830010641/http://www.yazamtech.com/#!products/c5ro, 2 pages.
SelectorIT, YazamTech, captured on Aug. 30, 2016, https://web.archive.org/web/20160830010641/http://www.yazamtech.com/#!selectorit/ccz3, 1 page.
ShuttleIT, YazamTech, captured on Aug. 30, 2016, https://web.archive.org/web/20160830010641/http://www.yazamtech.com/#!shuttelit/cv2j, 1 page.
Solutions, YazamTech, captured on Aug. 30, 2016, https://web.archive.org/web/20160830010641/http://www.yazamtech.com/#!solutions/c1mbk, 2 pages.
MetaDefender Email Security—4.7 Support for password protected attachments, OPSWAT, retrieved Sep. 27, 2018, https://onlinehelp.opswat.com/emailv4/4.7_Support_for_password_protected_attachments.html, 9 pages.
בלמ"ס (Hebrew-language document A), 11 pages.
דו"ח בדיקות ביטחון למערכת הלבנה SelectorIT (Hebrew-language document B), Sep. 11, 2011, 6 pages.

\* cited by examiner

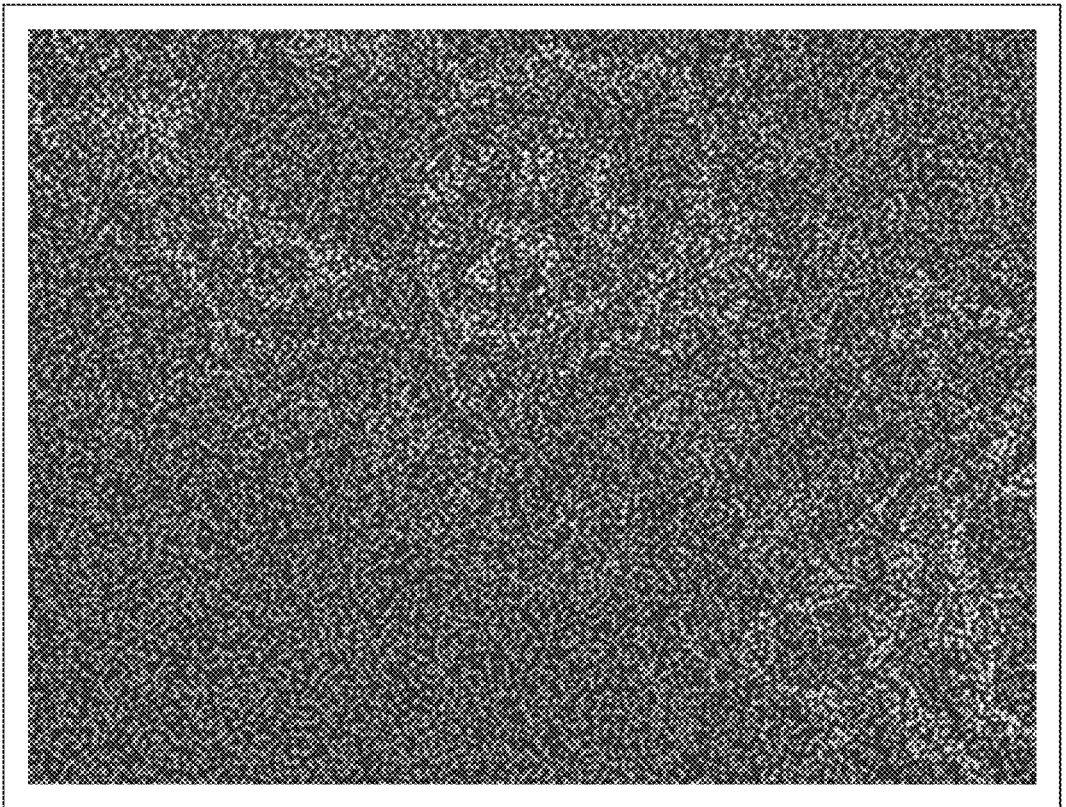
480  Fig. 4C
Notes:
The image in Fig. 4C is the result of Diff [Fig. 4A – Fig. 4B]
Black pixel = equality
Grey pixel = different (lighter = larger change)

```
.data:00000004  90              nop
.data:00000005  90              nop
.data:00000006  90              nop
.data:00000007  90              nop
.data:00000008  31c9            xor ecx,ecx
.data:0000000a  648b7130        mov esi,DWORD PTR fs:[ecx+0x30]
.data:0000000e  8b760c          mov esi,DWORD PTR [esi+0xc]
.data:00000011  8b761c          mov esi,DWORD PTR [esi+0x1c]
.data:00000014                  loc_00000014:
.data:00000014  8b6e08          mov ebp,DWORD PTR [esi+0x8]
.data:00000017  8b7e20          mov edi,DWORD PTR [esi+0x20]
.data:0000001a  8b36            mov esi,DWORD PTR [esi]
.data:0000001c  384f18          cmp BYTE PTR [edi+0x18],cl
.data:0000001f  75f3     "A" →  jne loc_00000014
.data:00000021  51              push ecx
.data:00000022  6832355f33      push 0x32335f32
.data:00000027  6866587773      push 0x73775866
.data:0000002c  68b7f0f098      push 0x98f0f0b7
.data:00000031  89e6            mov esi,esp
.data:00000033  b503            mov ch,0x3
.data:00000035  29cc            sub esp,ecx
.data:00000037  29cc            sub esp,ecx
.data:00000039  89e7            mov edi,esp
.data:0000003b  d6              (bad)
.data:0000003c  f3aa     "B" →  rep stos BYTE PTR es:[edi],al
.data:0000003e  41              inc ecx
.data:0000003f  51              push ecx
.data:00000040  41              inc ecx
.data:00000041  51              push ecx
.data:00000042  57              push edi
.data:00000043  51              push ecx
.data:00000044  83ef2c          sub edi,0x2c
.data:00000047                  loc_00000047:
.data:00000047  a4              movs BYTE PTR es:[edi],BYTE PTR ds:[esi]
.data:00000048  4f              dec edi
.data:00000049  8b5d3c          mov ebx,DWORD PTR [ebp+0x3c]
.data:0000004c  8b5c1d78        mov ebx,DWORD PTR [ebp+ebx*1+0x78]
.data:00000050  01eb            add ebx,ebp
.data:00000052  8b4b28          mov ecx,DWORD PTR [ebx+0x28]
.data:00000055  01e9            add ecx,ebp
.data:00000057  56              push esi
```

```
.data:00000000  90              nop
.data:00000001  90              nop
.data:00000002  91              xchg ecx,eax
.data:00000003  91              xchg ecx,eax
.data:00000004  91              xchg ecx,eax
.data:00000005  90              nop
.data:00000006  90              nop
.data:00000007  90              nop
.data:00000008  30c8            xor al,cl
.data:0000000a  636c72318a758b  arpl WORD PTR [edx+esi*2+0xb758a31],cx
.data:00000011  8c7f1d          mov WORD PTR [edi+0x1d],?
.data:00000014  8a6f07          mov ch,BYTE PTR [edi+0x7]
.data:00000017  8c7f21          mov WORD PTR [edi+0x21],?
.data:0000001a  8b36            mov esi,DWORD PTR [esi]
.data:0000001c  385019          cmp BYTE PTR [eax+0x19],dl
.data:0000001f  76f2            jbe loc_00000013
.data:00000021  50              push eax
.data:00000022  67336c34        xor esp,DWORD PTR [bx+si+0x34]
.data:00000026  336867          xor ebp,DWORD PTR [ecx+0x67]
.data:00000029  55              push ebp
.data:0000002a  7672    "A1"→   jbe loc_0000009e
.data:0000002c  68b78f88b7      push 0x9f888fb7
.data:00000031  88e6            mov dh,ah
.data:00000033  b503            mov ch,0x3
.data:00000035  2acd            sub cl,ch
.data:00000037  2acc            sub cl,ah
.data:00000039  89e7            mov edi,esp
.data:0000003b  d7              xlat BYTE PTR ds:[ebx]
.data:0000003c  f4              hlt
.data:0000003d  ab              stos DWORD PTR es:[edi],eax
.data:0000003e  41              inc ecx
.data:0000003f  51              push ecx
.data:00000040  41              inc ecx
.data:00000041  50              push eax
.data:00000042  56              push esi
.data:00000043  50              push eax
.data:00000044  83ef2c          sub edi,0x2c
.data:00000047  a4      "B1"→   movs BYTE PTR es:[edi],BYTE PTR ds:[esi]
.data:00000048  4f              dec edi
.data:00000049  8b5d3c          mov ebx,DWORD PTR [ebp+0x3c]
.data:0000004c  8b5b1c          mov ebx,DWORD PTR [ebx+0x1c]
.data:0000004f  7702            ja loc_00000053
.data:00000051  ec              in al,dx
.data:00000052  8c4b20          mov WORD PTR [ebx+0x20],cs
.data:00000055  01e8            add eax,ebp
.data:00000057  55              push ebp
.data:00000058  30d2            xor dl,dl
```

SYSTEM AND METHOD FOR DISARMING MALICIOUS CODE

PRIORITY CLAIM

This application is a continuation of U.S. application Ser. No. 15/441,860, filed Feb. 24, 2017, which claims priority under 35 U.S.C. § 119 to U.S. provisional patent application no. 62/442,452, filed on Jan. 5, 2017. Each of the aforementioned applications is incorporated herein by reference in its entirety.

BACKGROUND

A shellcode is a small piece of program code that may be embedded in a file that hackers can use to exploit vulnerable computers. Hackers typically embed shellcode in a file to take control of a computer when the computer runs a program to open or read the file. It is called "shellcode" because it typically starts a "command shell" to take control of the computer, though any piece of program code or software that performs any malicious task, like taking control of a computer, can be called "shellcode."

Most shellcode is written in a low level programming language called "machine code" because of the low level at which the vulnerability being exploited gives an attacker access to a process executing on the computer. Shellcode in an infected or malicious file is typically encoded or embedded in byte level data—a basic data unit of information for the file. At this data unit level of a file, actual data or information for the file (e.g., a pixel value of an image) and executable machine code are indistinguishable. In other words, whether a data unit (i.e., a byte(s) or bit(s)) represents a pixel value for an image file or executable shellcode cannot typically be readily determined by examination of the byte level data.

Indeed, shellcode is typically crafted so that the infected or malicious file appears to be a legitimate file and in many cases functions as a legitimate file. Additionally, an infected or malicious file including embedded shellcode may not be executable at all by some software applications, and thus the infected file may appear as a legitimate file imposing no threat to a computer. That is, an infected or malicious image file, for example, may be processed by an application executed on a computer to display a valid image and/or to "execute" the byte level data as "machine code" to take control of a computer or to perform other functions dictated by the shellcode. Thus, whether a process executing on a computer interprets a byte or sequence of bytes of a file to represent information of the file, or instead to execute malicious machine code, depends on a vulnerability in a targeted application process executed on the computer.

Shellcode is therefore often created to target one specific combination of processor, operating system and service pack, called a platform. Additionally, shellcode is often created as the payload of an exploit directed to a particular vulnerability of targeted software on a computer, which in some cases may be specific to a particular version of the targeted software. Thus, for some exploits, due to the constraints put on the shellcode by the target process or target processor architecture, a very specific shellcode must be created. However, it is possible for one shellcode to work for multiple exploits, service packs, operating systems and even processors.

Attackers typically use shellcode as the payload of an exploit targeting a vulnerability in an endpoint or server application, triggering a bug that leads to "execution" of the byte level machine code. The actual malicious code may be contained within the byte level payload of the infected file, and to be executed, must be made available in the application process space, e.g., memory allocated to an application for performing a desired task. This may be achieved by loading the malicious code into the process space, which can be done by exploiting a vulnerability in an application known to the shellcode developer. A common technique includes performing a heap spray of the malicious byte level shellcode, which includes placing certain byte level data of the file (e.g., aspects of the embedded shellcode) at locations of allocated memory of an application process. This may exploit a vulnerability of the application process and lead the processor to execute the shellcode payload.

One known heap spray technique implemented by hackers includes embedding the payload of the malicious shellcode in an image file to be opened by a victim computer. An example of this technique is the CVE-2014-0322 exploit. This exploit stored the payload of the malicious machine code in a downloadable JPG image file. The payload of the JPG image file included legitimate image bytes together with bytes representing the actual malicious code that caused the victim computer to execute the first stage of the attack. Had the JPG image file been blocked or disarmed to prevent or disrupt execution of the malicious code, the attack could have been prevented.

Another example of a shellcode attack is the CVE-2014-0502 exploit in which, as a first stage of attack, shellcode was used as part of an exploit targeting a vulnerability in a version of the Adobe® Flash® Player application to download a malicious GIF file, which contained encrypted/encoded shellcode embedded within. As part of a second stage of attack the shellcode in the infected GIF file is eventually executed, leading to download of the actual backdoor that compromised the victim computer.

Another technique that has been used by hackers included embedding shellcode in a file that itself does not contain the machine code that allows the hacker to take control of the computer. Instead, the executed shellcode points to another file or network location and directs the application process to load an executable side file (side channel) that allows the hacker to take control of the computer. One example of this is the CVE-2014-4114 exploit, which introduced a method to use a PowerPoint presentation that contained a remote or embedded image (e.g., slide1.gif) that is actually an executable (with PE header) file. The CVE-2014-4114 attack exploited a logical bug in application software that was used to trigger the embedded image as an executable, renaming slide1.gif to slide1.gif.exe, that was then automatically executed leading to full control of the victim computer.

Each of the above attacks used shellcode exploits contained within image files that were run, opened, or downloaded by application software of the victim computer. Similar attacks may also be staged using files including audio and/or video data or other file types—not just image data. In these examples, the malicious image files in some respect included legitimate image data that, but for a targeted vulnerability of particular application software, would not have resulted in execution of the embedded shellcode. That a malicious image file can include legitimate data and be used in many respects as expected, makes these kinds of attacks very difficult to prevent using conventional techniques.

For example, conventional techniques include attempts to identify malicious files by screening incoming files at a host computer or server based on a comparison of the possibly malicious code to a known malicious signature. These signature-based malware detection techniques, however, are incapable of identifying malicious files for which a malicious signature has not yet been identified. Accordingly, it is generally not possible to identify new malicious exploits, as the technique lags behind the crafty hacker. Furthermore, in most cases, malicious shellcode is embedded in otherwise legitimate files having proper structure and characteristics, such that they may not be detectable based on a signature-based comparison.

Another conventional technique is based on the use of behavior-based techniques or heuristics to identify characteristics of known shellcode exploits or other suspicious activity or behavior, such as that based on a heap spray attack. One such technique implements a "sandbox," (e.g., a type of secured, monitored, or virtual operating system environment) which can be used to virtually execute untested or untrusted programs, files, or code without risking harm to the host machine or operating system. That is, conventional sandbox techniques may execute or detonate a file while monitoring the damage or operations post-detonation such as writing to disk, network activity, spawn of new processes etc. and monitor for suspicious behaviors. This technique, however, also suffers from the inability to identify new exploits for which a (software) vulnerability has not yet been identified, e.g., so called zero-day exploits. Some sophisticated malware have also been developed to evade such "sandbox" techniques by halting or skipping if it detects that it is running in such a virtual execution or monitored environment. Furthermore, clever hackers consistently evolve their code to include delayed, or staged attacks that may not be detected from evaluation of a single file, for example, or may lay in wait for a future unknown process to complete an attack. Thus, in some situations it may be too computationally intensive or impracticable to identify some shellcode exploits using conventional sandbox techniques.

Furthermore, because shellcode attacks are often designed to exploit a specific vulnerability of a particular version of an application program, it is very difficult to identify a malicious file if that vulnerable version of the application program is not executed at a screening host computer or server. This creates additional problems for networks of computers that may be operating different versions of application or operating system software. Thus, while a shellcode attack included in a file may be prevented or undetected at a first computer because its application software does not include the target vulnerability, the malicious file may then be shared within the network where it may be executed at a machine that is operating the targeted vulnerable version of application software.

Thus, there is a need for alternative techniques to prevent malicious shellcode attacks, including new zero-day exploits.

SUMMARY

In the following description certain aspects and embodiments of the present disclosure will become evident. It should be understood that the disclosure, in its broadest sense, could be practiced without having one or more features of these aspects and embodiments. It should also be understood that these aspects and embodiments are merely example.

The disclosed embodiments include a method of disarming malicious code in a computer system having a processor. The method comprises accessing, by the computer system, input content, wherein the input content includes a plurality of data units having a value representing media content, and adjusting, by the processor, a data unit value of at least a portion of the data units, wherein the portion of the data units and an adjustment of the data unit value are determined so as to render any malicious code included in the plurality of data units inactive for its intended malicious purpose while not interfering with an intended use of the input content.

The disclosed embodiments include a non-transitory computer-readable medium storing instructions, that when executed by a processor, cause the processor to perform operations for disarming malicious code in a computer system. The operations comprise accessing input content, wherein the input content includes a plurality of data units having a value representing media content, and adjusting a data unit value of at least a portion of the data units, wherein the portion of the data units and an adjustment of the data unit value are determined so as to render any malicious code included in the plurality of data units inactive for its intended malicious purpose while not interfering with an intended use of the input content.

Another disclosed embodiment includes a system for disarming malicious code. The system comprises a memory device storing a set of instructions, and a processor configured to execute the set of instructions to access input content, wherein the input content includes a plurality of data units having a value representing media content, and adjust a data unit value of at least a portion of the data units, wherein the portion of the data units and an adjustment of the data unit value are determined so as to render any malicious code included in the plurality of data units inactive for its intended malicious purpose while not interfering with an intended use of the input content.

It is to be understood that both the foregoing general description and the following detailed description are by example and explanatory only, and are not restrictive of the disclosed embodiments, as claimed.

BRIEF DESCRIPTION OF THE DRAWINGS

The subject matter regarded as the invention is particularly pointed out and distinctly claimed in the concluding portion of the specification. The disclosed principles, however, both as to organization and method of operation, together with objects, features, and advantages thereof, may best be understood by reference to the following detailed description when read with the accompanying drawings in which:

FIG. 4C presents a difference image of a comparison between the input file image of FIG. 4A and the modified file image of FIG. 4B;

FIG. 5A presents a hexadecimal dump of the input file of FIG. 4A including embedded shellcode;

FIG. 5B presents a hexadecimal dump of the modified file of FIG. 4B;

FIG. 6A is a partial disassembled output of the input file of FIG. 4A including embedded shellcode; and FIG. 6B is a partial disassembled output of the modified file of FIG. 4B presenting a change in the embedded shellcode.

Figure 1:
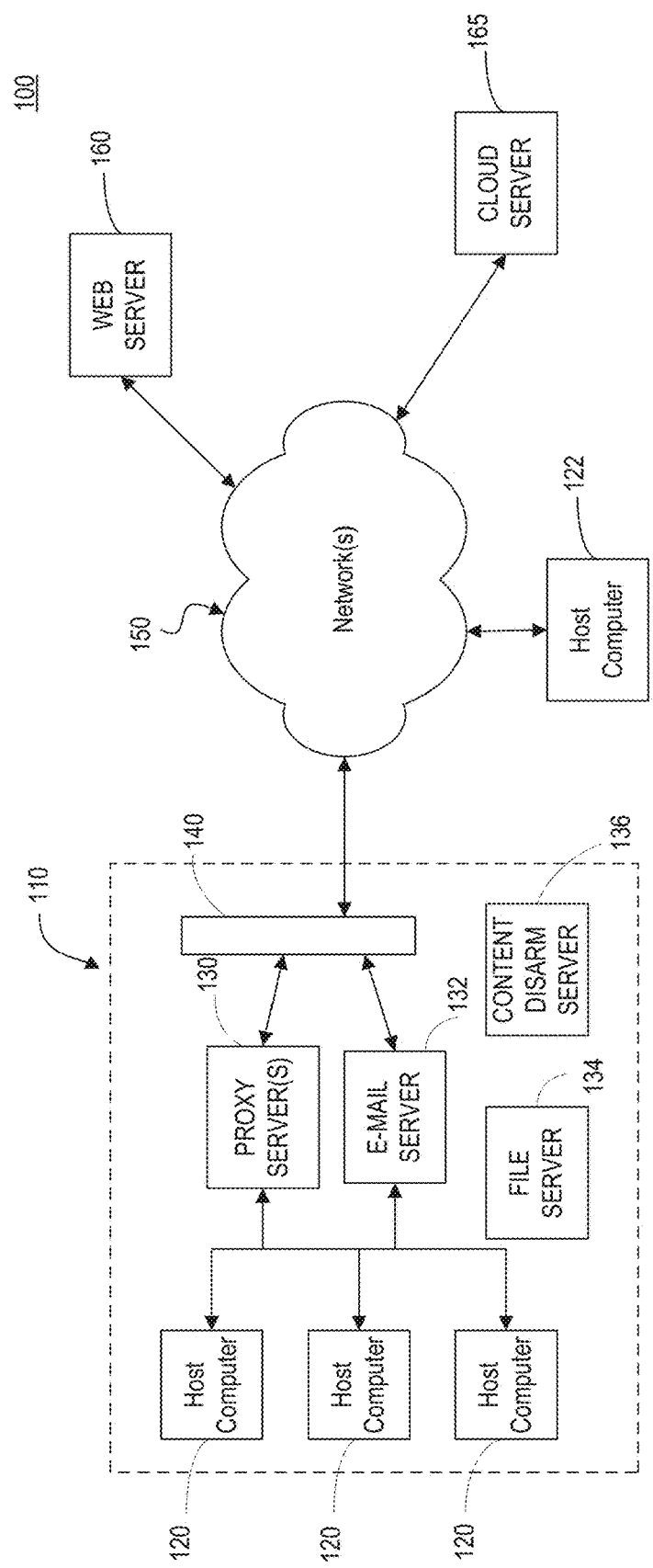
FIG. 1 is a schematic block diagram of an example computing environment consistent with the disclosed embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments.

As explained above, one technique hackers use to obtain control of a victim computer or computing environment is through the execution of malicious code at the victim computer or computing environment. One tool used by hackers that is the focus of example embodiments is the embedding of malicious shellcode in media content or a file of media content file type, such as an image, audio, video, or multimedia file type. The example embodiments, however, are also applicable to other non-media content and non-media content file types that encode data in a binary data format or other format that allows a binary data block to be embedded in them such that they may include encoded malicious shellcode.

Some hackers aim to exploit specific computer application or operating system vulnerabilities to load bit or byte values of the embedded/encoded malicious shellcode into allocated memory of an application process so as to execute the malicious shellcode to take control of the victim computer or to perform other desired functions. One of ordinary skill in the art would understand that hackers implement many different and evolving techniques to execute shellcode, and that the disclosed embodiments include general principles aimed to disarm or prevent the intended execution of malicious shellcode in input content or an input file regardless of the particular process or techniques a hacker has implemented in the design of the shellcode. Accordingly, the disclosed embodiments provide advantages over techniques for identifying or disarming malicious code, including zero-day exploits, which rely on detection of a known malware signature or detection of suspicious behavior. That is, the disclosed embodiments can disarm any malicious code included in input content without relying on signature-based or behavior-based malware detection techniques or any knowledge of a particular computer vulnerability or other hacking technique.

The example embodiments provide, for example, advantages over techniques that rely on an identifiable anomaly in an input file, or deviation of relevant specifications of a file type. For example, some shellcode attacks can be prevented if an input file is not properly structured according to the relevant specifications of the file type. Shellcode attacks that are based on files that might not be structured according to file type specifications, thereby exploiting structural vulnerability of the file, can be detected and/or prevented using the example techniques described in U.S. Pat. No. 9,047,293 to Grafi et al. However, certain shellcode attacks that preserve a specified structure of a file type or otherwise resemble a legitimate file, but contain embedded/encoded shellcode, either as the payload of a malicious attack or as a side channel to another vulnerability, cannot typically be detected using, for example, the techniques described in U.S. Pat. No. 9,047,293.

Other malicious-file identification techniques are known that identify byte-level patterns of known or common malicious shellcode in an input file (e.g., signature-based malware detection), or use a "sandbox" (e.g., signature-based or behavior-based) or other techniques to "execute" or "detonate" potentially malicious code in a protected manner to identify suspicious activity. These malicious-file identification techniques, however, also suffer from an inability to identify new exploits and other techniques used by hackers to stay ahead of sophisticated file screening tools. The disclosed embodiments also provide advantages over these techniques because, as described in detail below, malicious code in an input file can be disarmed without computationally intensive inspection and examination of the input file and without first detecting suspected malicious content or otherwise suspicious content.

Suspicious content may or may not include malicious code. Suspicious content refers, for example, to a situation where input content may potentially or more likely include malicious code, such as when the input content comes from or is associated with an untrusted source. Content may be deemed suspicious based on one or more characteristics of input content itself or the manner in which it is received as well as other factors that alone or together may cause suspicion. One example of a characteristic associated with the input content refers to a property associated with the input content. In one example, the property may identify an author of the input content and the system determines whether the author property matches the source from which the input content was received and if there is no match then the system marks the input content as suspicious.

Although example embodiments need not first detect suspicious content or malicious content in order to disarm any malicious code included in input content, in some embodiments, upon identifying suspicious or malicious content, the disclosed processes are run to render any malicious code that may be included in the input content inactive for its intended malicious purpose.

Although the example embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within a computer's registers and/or memories into other data similarly represented as physical quantities within the computer's registers and/or memories or other non-transitory information storage media that may store instructions to perform operations and/or processes. Although the example embodiments are not limited in this regard, the terms "plurality" and "a plurality," as used herein, may include, for example, "multiple" or "two or more". The terms "plurality" or "a plurality" may be used throughout the specification to describe two or more components, devices, elements, units, parameters, or the like. The term "set" when used herein may include one or more items. Unless explicitly stated, the example methods and processes described herein are not constrained to a particular order or sequence. Additionally, some of the described embodiments or elements thereof can occur or be performed simultaneously, at the same point in time, or concurrently.

Shellcode, a machine code encoded in the data units or values of input content or an input file that is executed bit by bit by a processor of a computing device, may be used as the payload in an exploitation of a vulnerability of a software application or operating system. Shellcode is commonly embedded or encoded in the data units of seemingly legitimate content, files, or other objects that may be run, processed, or executed by an application or operating system of the victim computer or computing device. A data unit of input content or an input file may include a byte or bits, or string of bytes or bits, having a value that represents an aspect of content of the file. For example, in some embodiments, a data unit of an input file of an image type may include a byte or bits or string of bytes or bits that encodes a pixel value of an image or a sample of audio data. In the example embodiments, the size of a data unit may depend on the file type, content type or other characteristic of the input file. A file including embedded or encoded shellcode may be an input file that is accessed by a computing system by any number of means, such as by importing locally via an external storage device, downloading or otherwise receiving from a remote webserver, file server, or content server, for example, or from receiving as an e-mail or via e-mail or any other means for accessing or receiving a file or file-like input content. An input file may be a file received or requested by a user of a computing system or other files accessed by processes or other applications executed on a computing system that may not necessarily be received or requested by a user of the computing system. An input file according to the disclosed embodiments may include any file or file-like content, such as an embedded object, that is processed, run, or executed by an application or operating system of a computing system. Input content may include electronic mail, for example, or streamed content or other content of a format having at least one data unit or an object having at least one data unit.

The embedded/encoded shellcode payload is an actual machine code that may cause execution flow alteration of an application process that may then be executed by the victim computer to perform any desired action intended by a shellcode developer. The example embodiments are directed to modifying the encoded shellcode bytes/bits to disarm, e.g., prevent, affect, or disrupt, the execution of malicious shellcode, so that it does not enable or provide the intended function of the shellcode. For example, a modification of a byte or bit level value of a data unit is intended to change the encoded malicious machine code or aspects of the malicious machine code such that it generates a non-valid processor instruction(s), thereby thwarting a completed attack, and/or changes the malicious machine code sufficiently so it will not execute as intended by the attacker or enable a function intended by the attacker.

The present disclosure describes, among other things, example processes for modifying data unit values (e.g., byte or bit level values) of a received or accessed input file or input content having at least one type of media content, such as image data, video data, and/or audio data. The example processes create a modified input file (or modified input content) including adjusted data unit values of at least a portion of the media content data of the input file (or input content). The example processes thereby aim to disarm (e.g., prevent, affect, or disrupt) certain malicious attacks caused by shellcode embedded in the received input file (or input content). In some embodiments, the portion of media content data selected for modification may be determined so as to increase a probability that at least some of the modified data units of media content corresponds to a part of shellcode encoded in the input file. Accordingly, the example embodiments aim to prevent, affect, or disrupt complete execution of any shellcode remaining in the modified input file (or modified input content). The following disclosure provides additional discussion of example embodiments for disarming malicious shellcode of an input file (or input content). While some embodiments of the present disclosure refer to an input file, the disclosed techniques are also applicable to object within or embedded in an input file or to input content generally, without consideration as to whether it can be characterized as a file or object. Most files and at least some objects, for example, conform to a structure associated with an application(s) used to access them, as explained in U.S. Pat. No. 9,047,293, the content of which is incorporated herein by reference. Indeed, techniques disclosed in the aforementioned patent may be combined with techniques disclosed herein in some embodiments, and together they may provide robust protection against malicious attacks.

According to an example embodiment, any malicious code or shellcode included in input content received by a computer system may be disarmed or rendered inactive for its intended malicious purpose without applying a malware detection algorithm to the input content. That is, it is not necessary to first detect any malicious code or suspected malicious or suspicious content in the input content in order to render the malicious code inactive for its intended malicious purpose. In some embodiments, one or more malware detection techniques may be implemented together with the exemplary embodiments, but knowledge or awareness of suspected malicious or suspicious code or content is not required to disarm any malicious code that may be included in the input content. According to an example embodiment, a processor of a computing system may automatically apply a data value alteration model to the input content for altering select data values within the input content and output new content reflecting an application of the data value alteration model to the input content. The data value alteration model renders any malicious code included in the input content inactive for its intended malicious purpose without regard to any structure or format used to encapsulate the input content. That is the data value alteration model may be applied to input content without changing a structure, format or other specification for the input content. Additionally, the data value alteration model is determined such that a change to even a part of any malicious code included in the input content could render the malicious code inactive for its intended malicious purpose. In some embodiments, a malware detection algorithm may be applied to the new content reflecting an application of the data value alteration model to the input content to confirm the applied data value alteration model rendered any malicious code included in the input content inactive for its intended malicious purpose.

According to an example embodiment, malicious code, such as shellcode, in an input file or input content may be disarmed by applying intentional "noise" to the input file according to a data value alteration model, such as by changing the data unit values of at least some of the data units of the original input file to thereby create a modified input file. According to other embodiments for which a lossy compression is applicable for the specific format of the input file, the input file may be re-compressed to create a modified input file. The disclosed embodiments thereby change the bit or byte level representation of the content of the input file, such as an image, audio or video, but do so in a way intended to preserve a user's perceptibility of the content and not to prevent or interfere with an intended use of the content. As a result, at least some aspects of any malicious shellcode that may have been embedded in legitimate content data will have changed in the modified input file and will no longer be operational as intended, while a user's perception of the modified content, whether an image, an audio output or a video clip, will be largely unchanged. In some embodiments, the added "noise" may be added to randomly selected data units to eliminate any replay attack, to thwart crafty hackers, and so that any perceptible changes in the modified content to the user, whether visual and/or aural, may be minimal or negligible and at least will not prevent or interfere with an intended use of the content.

Upon opening, loading, playing, or otherwise accessing the modified input file, the changed/disarmed shellcode in the modified input file will contain a non-valid processor instruction(s) and/or illogical execution flow. Attempts at running or executing the disarmed shellcode will result in a processor exception and process termination, which will prevent a successful attack. While aspects of the example embodiments are described herein below as applied to an image file format, the example embodiments may be applied, with the apparent changes, to other media content file formats, such as image files (in any known format), audio files (in any known format) and video files (in any known format).

Reference is now made to FIG. 1, which is a block diagram of an example computing environment 100, consistent with example embodiments of the present disclosure. As shown, system 100 may include a plurality of computing systems interconnected via one or more networks 150. A first network 110 may be configured as a private network. The first network 110 may include a plurality of host computers 120, one or more proxy servers 130, one or more e-mail servers 132, one or more file servers 134, and a firewall 140. Any of proxy server 130, e-mail server 140, or firewall 132 may be considered an edge network device that interfaces with a second network, such as network 150. Host computers 120 and other computing devices of first network 110 may be capable of communicating with one or more web servers 160, cloud servers and other host computers 122 via one or more additional networks 150.

Networks 110 and 150 may comprise any type of computer networking arrangement used to exchange data among a plurality of computing components and systems. Network 110 may include a single local area network, or a plurality of distributed interconnected networks and may be associated with a firm or organization. The interconnected computing systems of network 110 may be within a single building, for example, or distributed throughout the United States and globally. Network 110, thus, may include one or more private data networks, a virtual private network using a public network, one or more LANs or WANs, and/or any other suitable combination of one or more types of networks, secured or unsecured.

Network(s) 150, likewise may comprise any type of computer networking arrangement for facilitating communication between devices of the first network 110 and other distributed computing components such as web servers 160, cloud servers 165, or other host computers 122. Web servers 160 and cloud servers 165 may include any configuration of one or more servers or server systems interconnected with network 150 for facilitating communications and transmission of content or other data to the plurality of computing systems interconnected via network 150. In some embodiments, cloud servers 165 may include any configuration of one or more servers or server systems providing content or other data specifically for the computing components of network 110. Network 150 may include the Internet, a private data network, a virtual private network using a public network, a Wi-Fi network, a LAN or WAN network, and/or other suitable connections that may enable information exchange among various components of system 100. Network 150 may also include a public switched telephone network ("PSTN") and/or a wireless cellular network.

Host computers 120 and 122 may include any type of computing system configured for communicating within network 110 and/or network 150. Host computers 120, 122 may include, for example, a desktop computer, laptop computer, tablet, smartphone and any other network connected device such as a server, server system, printer, as well as other networking components.

File server 134 may include one or more file servers, which may refer to any type of computing component or system for managing files and other data for network 110. In some embodiments, file server 134 may include a storage area network comprising one or more servers or databases, or other configurations known in the art.

Content disarm server 136 may include one or more dedicated servers or server systems or other computing components or systems for performing aspects of the example processes for modifying input content to disarm malicious shellcode. Content disarm server 136 may be in communication with any of the computing components of first network 110, and may function as an intermediary system to receive input content or an input file from proxy server 130, e-mail server 132, file server 134, host computer 120, or firewall 140 and return, forward, or store a modified input file or modified content according to the example embodiments. Content disarm server 136 may also be configured to perform one or more malware detection algorithms, such as a signature-based malware detection algorithm, or other known behavior-based algorithms or techniques for detecting malicious activity in a "sandbox," for example. In some embodiments, one or more malware detection algorithms may be implemented to confirm that the disclosed techniques rendered any malicious code included in input content inactive for its intended purpose. One or more malware detection algorithms may also be implemented to first screen input content for known malicious content, whereby the example embodiments are implemented to disarm any malicious code included in the input content that may not have been detected by the one or more malware detection algorithms. Likewise, content disarm server 136 may also be configured to perform one or more algorithms on received input content for identifying suspicious content.

In some embodiments, content disarm server 136 and or file server 134 may include a dedicated repository for storing input content received by content disarm server 136. The dedicated repository may be restricted from general access by users or computers of network 110. In some embodiments, all or select input content may be stored for a predetermined period of time or according to a policy of a network administrator, for example. In some embodiments, input content may be stored in association with modified input content for which any included malicious code has been rendered inactive for its intended malicious purpose.

Proxy server 130 may include one or more proxy servers, which may refer to any type of computing component or system for handling communication requests between one or more interconnected computing devices of network 110. In some embodiments, proxy server 130 may be configured as one or more edge servers positioned between a private network of first network 110, for example, and public network 150.

E-mail server 132 may include one or more e-mail servers, which may refer to any type of computing component or system for handling electronic mail communications between one or more interconnected computing devices of network 110 and other devices external to network 110. In some embodiments, e-mail server 132 may be configured as one or more edge servers positioned between a private network of first network 110, for example, and public network 150.

First network 110 may also include one or more firewalls 140, implemented according to any known firewall configuration for controlling communication traffic between first network 110 and network 150. In some embodiments, firewall 140 may include an edge firewall configured to filter communications entering and leaving first network 110. Firewall 140 may be positioned between network 150 and one or more of proxy server 130 and e-mail server 132. In the embodiment shown, proxy server 130, e-mail server 132 and firewall 140 are positioned within first network 110, however, other configurations of network 110 are contemplated by the present disclosure. For example, in another embodiment, one or more of the proxy server 130, e-mail server 132 and firewall 140 may be provided external to the first network 110. Any other suitable arrangement is also contemplated. Additionally, other networking components, not shown, may be implemented as part of first network 110 or external to network 110 for facilitating communications within the first network 110 and with other external networks, such as network 150.

As described in greater detail below, the processes of the example embodiments may be implemented at any one of the computing devices or systems shown in FIG. 1, including host computer 120, 122, proxy server 130, e-mail server 132, file server 134, content disarm server 136, firewall 140, and cloud server 165.

Figure 2:
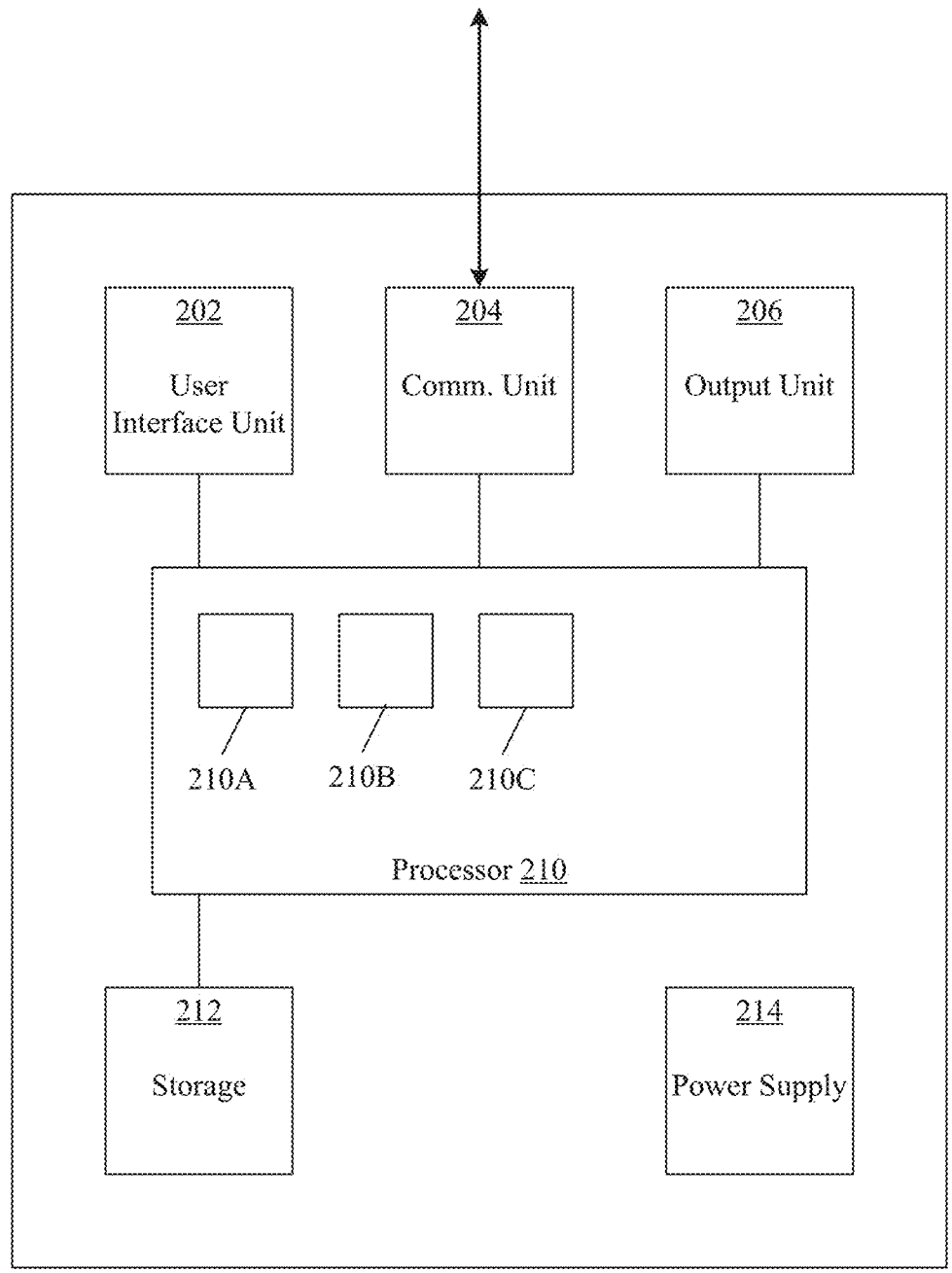
FIG. 2 is a schematic block diagram of an example computing system adapted to perform aspects of the disclosed embodiments.

Reference is now made to FIG. 2, which is a schematic block diagram of an example computing system 200 adapted to perform aspects of the disclosed embodiments. According to the example embodiments, computing system 200 may be embodied in one or more computing components of computing environment 100. For example, computing system 200 may be provided as part of host computer 120,122, proxy server 130, e-mail server 132, file server 134, content disarm server 136 or cloud server 165, for example. In some embodiments, computing system 200 may not include each element or unit depicted in FIG. 2. Additionally, one of ordinary skill in the art would understand that the elements or units depicted in FIG. 2 are examples only and a computing system according to the example embodiments may include additional or alternative elements than those shown.

Computing system 200 may include a controller or processor 210, a user interface unit 202, communication unit 104, output unit 206, storage unit 212 and power supply 214. Controller/processor 210 may be, for example, a central processing unit processor (CPU), a chip or any suitable computing or computational device. Controller/processor 210 may be programmed or otherwise configured to carry out aspects of the disclosed embodiments.

Controller/processor 210 may include a memory unit 210A, which may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory unit 210A may be or may include a plurality of, possibly different memory units. Memory 210A may be a computer or processor non-transitory readable medium, or a computer non-transitory storage medium, e.g., a RAM.

Controller/processor 210 may further comprise executable code 210B which may be any executable code, e.g., an application, a program, a process, task or script. Executable code 210B may be executed by controller 210 possibly under control of operating system 210C. For example, executable code 210B may be an application that when operating performs one or more aspects of the example embodiments.

User interface unit 202 may be any interface enabling a user to control, tune and monitor the operation of computing system 200, including a keyboard, touch screen, pointing device, screen, audio device such as loudspeaker or earphones.

Communication unit 204 may be any communication supporting unit for communicating across a network that enables transferring, i.e. transmitting and receiving, digital and/or analog data, including communicating over wired and/or wireless communication channels according to any known format. Communication unit 204 may include one or more interfaces known in the art for communicating via local (e.g., first network 110) or remote networks (e.g., network 150) and or for transmitting or receiving data via an external, connectable storage element or storage medium.

Output unit 206 may be any visual and/or aural output device adapted to present user-perceptible content to a user, such as media content. Output unit 206 may be configured to, for example, display images embodied in image files, to play audio embodied in audio files and present and play video embodied in video files. Output unit 206 may comprise a screen, projector, personal projector and the like, for presenting image and/or video content to a user. Output unit 206 may comprise a loudspeaker, earphone and other audio playing devices adapted to present audio content to a user.

Storage unit 212 may be or may include, for example, a hard disk drive, a floppy disk drive, a Compact Disk (CD) drive, a CD-Recordable (CD-R) drive, solid state drive (SSD), solid state (SD) card, a Blu-ray disk (BD), a universal serial bus (USB) device or other suitable removable and/or fixed storage unit. Data or content, including user-perceptible content may be stored in storage unit 212 and may be loaded from storage 212 into memory unit 210A where it may be processed by controller/processor 210. For example, memory 210A may be a non-volatile memory having the storage capacity of storage unit 212.

Power supply 214 may include one or more conventional elements for providing power to computing system 200 including an internal batter or unit for receiving power from an external power supply, as is understood by one of ordinary skill in the art.

Figure 3:
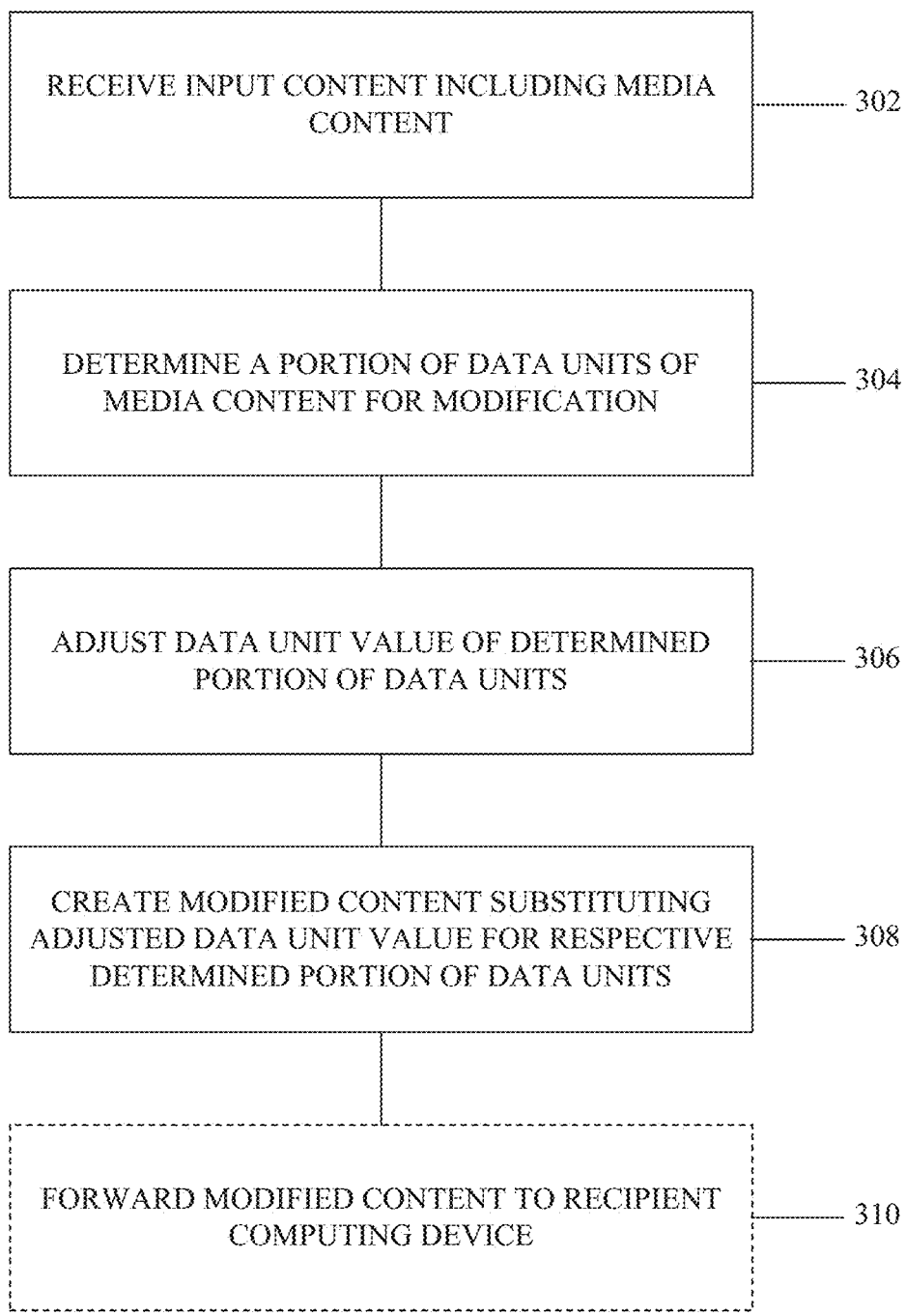
FIG. 3 is a flowchart of an example process for modifying an input file, consistent with the disclosed embodiments.

Reference is now made to FIG. 3, which is a flowchart of an example process for modifying input content, which in some embodiments may include an input file, consistent with the disclosed embodiments. According to the example embodiments, process 300 may be implemented to disarm malicious shellcode or aspects of malicious shellcode encoded in one or more data units of input content.

At operation 302, input content may be received or accessed by a computing system, such as computing system 200, which may be included in any of the computing elements in computing environment 100, including host computer 120, 122, proxy server 130, e-mail server 132, file server 134, content disarm server 136 or cloud server 165, for example. In some embodiments, for example, the input content is received by a host computer 120, 122 that may be operated by an end-user. In other embodiments, the input content may be intended for host computer 120, 122 (or requested by host computer 120, 122) and is received by an intermediary computing system, such as proxy server 130, e-mail server 132, or firewall 140. In some embodiments, the input content may be received by a file server 134 or cloud server 165. Additionally, or alternatively, the input content may be received or accessed by content disarm server 136, from any of the computing components within network 110 or in communication with network 110.

The input content may be received or accessed by computing system 200 by any means known in the art, including such as by importing locally via an external storage device, downloading or otherwise receiving from a remote webserver, file server, or content server, for example, or by receiving via e-mail or any other means for accessing or receiving a file or file-like content.

The input content may include one or more data units having a value representing media content. Media content may include any user-perceptible content including image data, video data, or audio data. In some embodiments, the media content may include content adapted to be presented, i.e. shown and/or played, to a human, such as a user of a computing system. In other embodiments, the media content may not be configured for presentation to a user. The input content may be in the form of a file configured according to any known file type associated with media content or known or suspected to include data elements of media content.

Throughout this disclosure, a data unit may refer to a portion of media content included in input content or an input file. A data unit may include, for example, portions of an image file, of an audio file and/or of a video file that includes media content of the input file. The media content may be displayable image/video content and/or playable audio/video content. In an image file, for example, a pixel or pixel value may be considered a data unit. In an audio file a sequence of bits representing a short playable audio stream (e.g., as long as 1 ms) may be considered a data unit. And in a video file, in a similar manner, a sequence of bits representing a small portion of a video frame, and/or a sequence of bits representing a short playable audio stream of the video file, may be considered a data unit.

According to some embodiments, one or more rules may be applied by the receiving computing system (or other intermediary computing system) to received input content or files according to known techniques for identifying trusted or potentially suspicious input files or otherwise suspicious content. For example, a preliminary analysis of an input file may include determining the source of the input file, the file type, file structure, the process accessing the file, or any other characteristics associated with the input file that may enable a determination as to a potential for an input file to include malicious content or malicious shellcode, for example. A preliminary analysis is optional, but in some embodiments it may be useful to first screen an input file for content or characteristics known or suspected to be associated with malicious content or activity or otherwise suspicious content. In the example embodiments, however, any malicious code included in the input content can be rendered inactive for its intended malicious purpose without having first detected possible or suspected malicious or suspicious content. In some embodiments, the disclosed techniques may be performed when one or more malware detection techniques do not identify suspicious content or suspected malicious content in received input content. Additionally, in some embodiments, upon identifying suspicious or malicious content, the disclosed processes are run to render any malicious code that may be included in the input content inactive for its intended malicious purpose. One or more other known content screening or analysis techniques may be implemented in addition to the example embodiments.

In an example embodiment, an input file may be suspected to include shellcode, either based on a preliminary analysis of the input file or based on some other characteristic of the input file. For example, in some embodiments, an input file of a predetermined file type may automatically be deemed suspicious or suspected to include shellcode. The predetermined file type may include one or more file types associated with media content or capable of including media content. Additionally or alternatively, an input file may include any file of predetermined file type or other characteristic whether suspected to include shellcode or not. In some embodiments, each input file may be treated as potentially including shellcode, whether or not a preliminary analysis of the input file is also performed.

As part of operation 304, computing system 200 may execute a program or instructions or otherwise perform a process to determine a portion of data units of input content to be modified according to the example embodiments. In some embodiments, computing system 200 reads or parses the data units of the input content in a process without invoking an execution engine such as application software of the computing system 200 for rendering the input content. That is, in the example embodiments, computing system 200 does not render the input content, as such rendering of input content may result in triggering execution of malicious code. In an example embodiment, input content may include one or more input files or objects etc. In such an embodiment, each distinct file, object, or content of the received input content may be parsed one by one in separate iterative processes to disarm any malicious code included in received input content. This may help prevent staged shellcode attacks that may rely, for example, on an auxiliary input file or input content.

In some embodiments, the determined portion of data units may include those data units representing media content of an input file. This may be determined based on a file type or structure of the input file or by other means for identifying the data units of the payload or content of the input file, as distinguished from a header, instructions, or other data ancillary to the media content of the input file. In some embodiments each data unit representing media content or payload content of an input file may be included in the portion of data units to be modified. In other embodiments, predetermined portions or subsets of the data units of the input file may be determined for modification. And in some embodiments, the portions of data units may be determined randomly or pseudo-randomly. A random or pseudo-random number generator, as is commonly known in the art may be implemented to determine the portion of data units. Other techniques that appear random-like, or for which a pattern is not readily identifiable or detectable and not frequently repeatable may be used for determining the data units for modification. The predetermined portions may be based on a file type or other characteristic of the input content, input file or media content included therein. Additionally or alternatively, the method for determining the portion of data units may be based on a file type or other characteristic of the input file or media content, such as the encoding specified for the media content. Additionally, the number or proportion of determined data units of the input file to be modified may be based on a file type, size, or other characteristics of the input content, input file or media content included therein.

As part of operation 306, computing system 200 may adjust a data unit value of the portion of data units determined in operation 304. In the example embodiments, the data unit value may include a byte value or binary value represented by a bit or string of bits. The data unit value may encode information corresponding to an aspect of media content, such as a pixel value for image data, or a short (e.g., 1 ms) stream or sample of audio data including a frequency component, for example. In some embodiments, the aspect of media content encoded by a data unit value may correspond to user-perceptible content. In the example embodiments, an adjustment of the data unit value may include a binary change in the data unit value of a data unit. An adjustment of the data unit values may be uniformly performed on the determined portion of data units. Alternatively, the data unit values for individual data units or groups of data units may be performed individually and may include an adjustment different than other data units.

Operations 304 and/or 306 can be implemented as a data value alteration model that selects the data units for alteration or modification and determines by what amount or value (such as a binary value) the selected data unit values are to be altered. Selection of the data units and the alteration value can be performed according to an algorithm, consistent with the disclosed embodiments.

In an example embodiment, described in greater detail below with respect to FIGS. 4A-4C, input content may include an input file of an image type or a file including image data, and the data units of the media content (i.e., image data) of the input file include a binary value representative of a pixel value of the image data. In the example embodiment, a data unit value (i.e., binary representation of pixel value) of at least some of the data units is modified, adjusted, or changed. Thus, in a sense, in an example embodiment micro changes or "noise" may be applied to at least portions of the image data of the input file. The amount of noise (e.g., the number of pixels of image data whose value is changed), may be predetermined or based on one or more characteristics of the input file, as well as other factors detailed below according to an example data value alteration model. Likewise, the effect of the adjustment of the data unit value (e.g., the degree of change in intensity or color of a pixel), may also be predetermined or based on one or more characteristics of the input file, as well as other factors detailed below according to an example data value alteration model.

As part of operation 308, computing system 200 creates modified content, which may include a modified input file, by substituting the adjusted data unit values of the determined portion of data units with the adjusted data unit values of the respective data units. The modified content includes new content reflecting the application of a data value alteration model to the input content. In some embodiments, the data unit value of the determined portion of data units of a received input file may be overwritten by the adjusted data unit value. In other embodiments, a modified file or modified content may otherwise be created to include the adjusted data unit value in place of the data unit values of the respective determined portion of data units. In some embodiments, the modified content may be included in a reconstructed file in which aspects other than the media content of the input content or input file may also be modified or changed. For example, a header of an input file may be modified in a reconstructed file. A reconstructed file including the modified content may be encoded or compressed or the modified content alone may be encoded or compressed. Other changes to a structure, layout, or format of input content may also be implemented in a reconstructed file.

As part of optional operation 310, modified content or a modified file may be forwarded to a recipient computing device such as host computer 120,122 or a file server 134 or other computing device of computing environment 100. Operation 310 may be performed in those embodiments where process 300 is performed by a computing device or system other than an intended recipient of the input content, for example. In embodiments where process 300 is performed at a host computer 120, 122, for example, operation 310 may not be performed. Additionally, in some embodiments, modified content may be forwarded to one or more other computing devices or systems intermediate or alternative to an intended recipient computing device. In the example embodiments, the modified content may be presented (e.g., played or displayed) at the recipient computing device to a human user, or may otherwise be accessed, opened, processed, stored, etc. at the recipient computing device by the user or other process executing at the recipient computing device.

In some embodiments, aspects of process 300 for creating modified content may be controlled or effected by an end user of a host computer 120 or operator of a network 110, for example. In some embodiments, the end user or operator may be enabled to perceive the media content of a modified file, such as by viewing an image file or listening to an audio file. If the end user or operator perceives distortions in the modified file, the end user or operator may be provided with functionality for adjusting one or more parameters associated with performing process 300, such as a parameter dictating the number of data units to be modified, how the value of the data units are to be adjusted, or how the portion of data units is determined. In some embodiments, a program or other process executed on the computing system 200 may be configured to identify distortions in the modified file without input from an end user or operator. Thus, in some embodiments, aspects of process 300 may be iteratively performed to achieve desired functionality. In some embodiments, computing system 200 may be configured to learn and adjust over time one or more parameters for creating a modified file based one or more characteristics of an input file, for example.

Figure 4A:
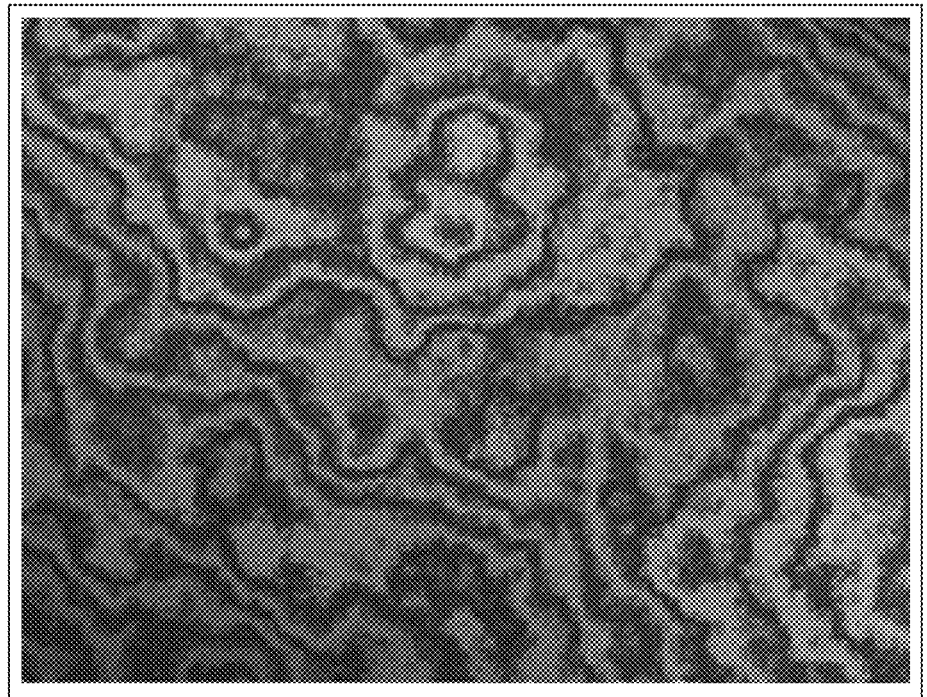
FIG. 4A presents a displayable image of a malicious input file including encoded shellcode.
Figure 4B:
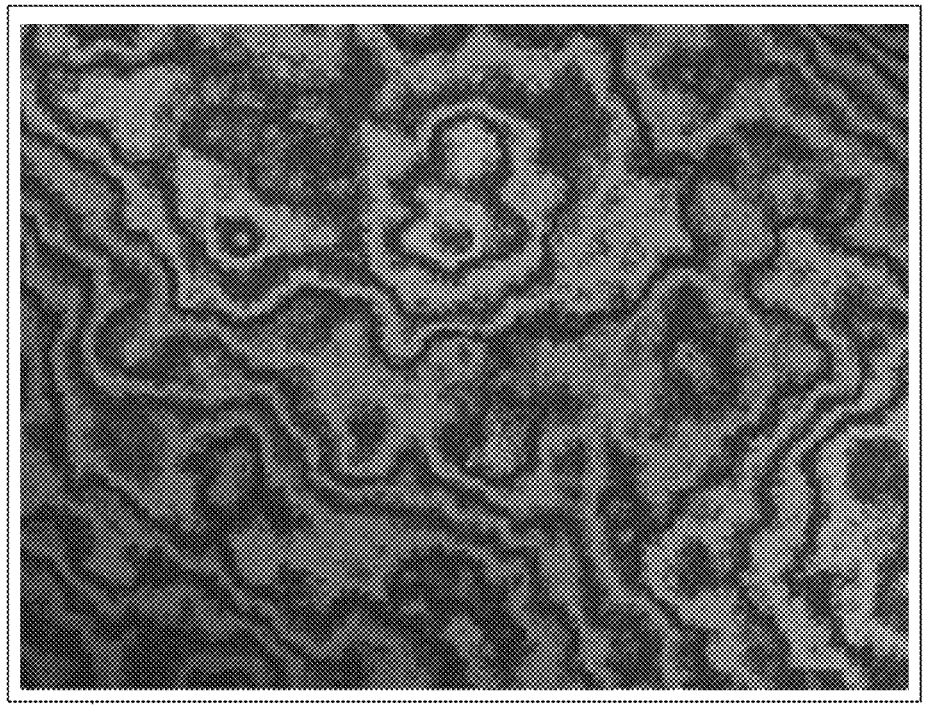
FIG. 4B presents a modified image of a modified file created from the input file of FIG. 4A consistent with the disclosed embodiments.

Additional details of aspects of example process 300 are now described in greater detail using an example input file of image data, with reference FIGS. 4A, 4B, and 4C. FIG. 4A includes a representation of an image of an image file (e.g., input file) including shellcode encoded in the data units of the image data. FIG. 4B includes a representation of an image of a modified input file based on the image file presented in FIG. 4A after its shellcode was disarmed according the example embodiments. FIG. 4C presents a difference image or a representation of the changes between the image data of the input file in FIG. 4A and the image data of the modified file of FIG. 4B, as generated by Beyond Compare®, a data comparison tool.

FIGS. 4A-4C can be used to explain aspects of an example process 300 performed on a bit map (BMP) image file (i.e., input file). As mentioned above, image 400 of FIG. 4A represents an image displayed using an application program of a computing device configured for displaying BMP format image files. BMP format refers generally to a bitmap image file. Other formats may also be used including a Portable Network Graphics (.PNG) file format, or a Joint Photographic Experts Group (.JPG or .JPEG) file format, as well other similar digital image file formats. The image data of an input corresponding to image 400 includes at least one data unit encoding one or more aspects of a malicious shellcode. In this example embodiment, aspects of process 300 add noise, e.g., by modifying or adjusting the data unit value of a data unit corresponding to a pixel of image 400. In this example embodiment, as part of operation 304, a portion of data units, (e.g., pixel values), of image file 400 are determined or randomly selected for modification according to a data value alteration model. The resulting modified file including image 450 of FIG. 4B, as shown, includes virtually no changes noticeable to an average human user. In this embodiment, a pixel value (i.e., color value) of the randomly selected portion of data units was adjusted in a way that may be virtually unnoticeable to the average human user, whether viewed alone or in comparison to the original input file.

Although changes in image 450 of a modified image file may be largely unnoticeable to a user, image 480 of FIG. 4C, can be used to illustrate the differences in data unit values between the original input file and the modified file. Image 480 of FIG. 4C is generated by applying a comparison function, for example, using the commercially-available Beyond Compare® tool of Scooter Software from Wisconsin, USA. Image 480 shows a representation of the differences between the data unit values of image 400 of an original input file as compared to the data unit values of corresponding data units of image 450 of the modified image file. Each black pixel in image 480 represents equality (i.e., no change) between the corresponding data unit values (e.g., pixel values) of data units (e.g., pixels) in images 400 and 450. Thus, the data units for these pixels were not part of the portion of data units of the input file determined for modification, as part of operation 304. A non-black (e.g., grey) pixel represents change in data unit values of corresponding data units in images 400 and 450. Thus, the data units for these pixels were among the portion of data units of the input file determined for modification, as part of operation 304. In this example, the non-black pixels range in intensity as can be seen in the varying colors of the grey pixels. The lighter the intensity or color of the pixel the larger the difference between the corresponding data unit values in images 400 and 450. Thus, in this example, the absolute value or magnitude of change in a data unit value for a data unit was not uniformly performed, as part of operation 306, with respect to the portion of data units determined in operation 304. As seen in FIG. 4C, the dominant tone is relatively dark, which demonstrates either a relatively small magnitude of change or no change to a majority of the data units of the input file.

Shellcode embedded in an input file, such as an image file, an audio file, or a video file, according to some embodiments, may be unnoticeable when/if the image or other media content of that file is presented to a user (visually and/or audibly). Indeed, hackers have been known to encode shellcode in the data units of an input file that is not easily detectable, if at all, by a user in user-perceptible media content. In many cases, the input file appears to be a legitimate media content file and is usable or operable as a legitimate content file. Yet, as long as shellcode remains embedded or encoded in the data units of an input file it may be activated or executed by an application process of computing system 200. For example, in some embodiments, any embedded shellcode may be executed when an input file is loaded by a browser application for web browsing in case of an image file, or loaded by a media player for playing or viewing an audio or video file, etc.

But, if the value of even one bit of a data unit of encoded shellcode or a sequence of shellcode is changed, the integrity of the shellcode can be breached, and the shellcode can be inactive or disarmed, meaning rendered inoperative or unable to take control over a computing system or perform other function as intended by the attacker. While a location of shellcode in the input file, e.g., the one or more data units of the input file including encoded shellcode, typically is not known and may not be detectable, there is a chance that randomly or pseudo-randomly selected data units (e.g., pixels) from the data units of the input file (e.g., all pixels of an image) may include at least one data unit, the value of which includes an encoded part of the shellcode. One of ordinary skill in the art would understand that, as part of operation 304, as the percent or proportion of randomly selected data units (e.g., pixels) increases, the likelihood that at least one of the selected data units includes encoded shellcode improves, even if the shellcode is encoded in only a relatively few data units.

As part of operation 304, according to an example embodiment, a number of data units or a proportion of data units may be determined for modification based on a desired amount of noise to be applied to an input file. Noise in this context means visual distortion, but the level is so minute that it cannot realistically be perceived by a typical observer. While altering a greater number or proportion of data units may improve the ability to disarm any encoded shellcode, applying too much "noise" to the input file (e.g., image file) may result in noticeable degradations or modifications of the user-perceptible content of the input file when/if the modified file is presented to a user.

In some embodiments, each input file or each input file of a predetermined type, etc., or all input content or input content having certain characteristics that is received by a computing system 200 may be processed according to an example process 300, including those input files and input content that do not contain any encoded shellcode nor are suspected contain any shellcode. In some embodiments, one or more malware detection algorithms may first be applied to input content and process 300 is performed only if no suspicious activity is detected. This is advantageous because the example process 300 does not assume that any input file is safe or trusted, based on a preliminary analysis of the input file (if performed) or otherwise. This improves the likelihood of disarming malicious shellcode including crafty attacks or exploits that are not easily detectable or not yet known (e.g., zero day exploits). But if computing system 200 of an example embodiment creates a modified file for each input file or those input files of predetermined type etc., even for completely legitimate or innocuous input files, it may be desirable or required in some computing environments that the modified file be free of noticeable degradation. This may be desirable so as not to impede usability of the input files by end users. In other words, according to this example, it may be undesirable to create a modified file if the media content (e.g., image) of the resulting modified file is degraded or modified too far from the image of the original input file such that it results in a noticeable difference by the average user or it is unacceptable according to an intended use of the input file. This may be true, even if the example process 300 succeeds in disarming any embedded/encoded shellcode in the original input file. Thus, in some embodiments, aspects of the example process 300 may be tailored to realize a balance between effectiveness in disarming shellcode and usability of a created modified file. In some embodiments, it is desirable to disarm any malicious code included in input content without interfering with an intended use of the input content, such as by not preventing use of the input content for its intended purpose. In some embodiments, an intended use of the input content will not be interfered with when no noticeable change or only a slight noticeable change is perceptible in the modified content when, for example, viewed on the computer and/or accessed via in an application executing on the computer.

An example process 300 can be applied to disarm shellcode encoded in an input file of image file formats such as .BMP, .PNG and .JPG with results that may be satisfactory to an end user or organization operating a network 110, for example. The tailoring of certain aspects of an example process have been determined to reliably disarm encoded shellcode while resulting in a modified file or modified content for which the applied noise in a modified image is hardly noticeable to the average user, if at all.

Example process 300 has been tested on an input file under various differing conditions or parameters. For an example test, noise was applied randomly to a percentage of the pixel values (each represented by 8 bits) of an image file ranging from 0.1 to 80 percent of all pixels of the image. In other words, as part of operation 304, a portion of data units (e.g., pixels) were determined based on a proportion or percentage of total data units representing media content (e.g., pixels of an image). In the example test, specific data units included in the portion of data units of the media content were selected randomly from the data units of the input file. Applying noise to (e.g., adjusting a data unit value of) randomly selected data units at rates of 0.1%-0.5% resulted in a modified image for which none of the tested observers noticed visible changes or discrepancies between the original input file image and the modified file image. Applying noise to randomly selected data units at rates higher than 2% resulted in a modified image for which at least about 25% of the tested observers could notice visible changes or discrepancies between the original input file image and the modified file image. Applying noise to randomly selected data units at a rate of 3% resulted in a modified image for which nearly all of the tested observers could notice a visible change or discrepancy between the original input file image and the modified file image. The percentage of selected data units resulting in noticeable visual changes may vary depending on the characteristics of a data unit. For example, a greater percentage of data units may be selected for an 8 bit data unit encoding scheme than for a 4 bit encoding scheme, because a single bit alteration of an 8 bit data unit causes a more subtle change than a single bit alteration of a 4 bit data unit. Although noticeable changes may be observed in a side-by-side comparison, in some embodiments the changes do not affect the intended use of the input content.

According to example embodiments, a probable likelihood of disarming malicious code in input content will depend on the length of the shellcode encoded in the input content. In some embodiments, a data value alteration model will apply noise randomly (or pseudo-randomly) to X percent of data units (e.g., the pixels of an image) may result in a reasonable probability that at least one data unit encoding embedded shellcode of Y length (e.g., the number of data units including encoded shellcode) may be modified, where X>=1/Y. For example, in some embodiments, randomly or pseudo-randomly selecting 1 percent of data units (e.g. 1 byte for every 100 bytes) will result in reasonable likelihood of modifying shellcode of 100 byte length (Y). For some shellcode, modification of just one bit of the encoded shellcode may disarm the shellcode.

The manner for adjusting a data unit value, as part of operation 306, for the portion of data units determined in operation 304 may also be performed to achieve desired results. As part of operation 306 of an example embodiment, a data unit value of a randomly selected data unit may be adjusted by the following example modification. In this example, a data unit represents a pixel value of a pixel of an image of the input file. The pixel value (e.g., data unit value) may be represented with an RGB value as is known in the art. In other embodiments, a pixel value of an image may be represented in other formats specific to an image type or file type, for example. In an example embodiment, the RGB value $X_{(m;n)}$, $Y_{(m;n)}$, $Z_{(m;n)}$, respectively, of a data unit of an input file (e.g., original pixel $P_{(m;n)}$) may be changed according to the following formula $X_{(m;n)} \pm i$, $Y_{(m;n)} \pm j$, $Z_{(m;n)} \pm k$, resulting in an adjusted value of modified pixel $Pmod_{(m;n)}$. The adjusted value corresponds to a binary data unit value, which may replace the respective data unit value in the modified file, as part of operation 308. The value of the RGB color modifiers i, j, k may vary. Yet to disarm most shellcode there may be no need to apply colors modifiers i, j, k, of a value greater than 1. Modifiers i, j, k, having a value higher than 5 may create a noticeable and/or undesirable change in the modified image of a modified file, without any added level of assurance for disarming shellcode. Thus, in an example embodiment, the expression that applies for the level of adjustment to a data unit value of each of a randomly (or pseudo-randomly) selected data unit or pixels $P(m;n)=\{r;g;b\}_{(m;n)}$ in an image array M:N according to an example data value alteration model will be:

$$P(mod)_{(i;j)}=\{r \pm i; g \pm j; b \pm k\}\{0 \le (i,j,k) < 5\}$$

In an example embodiment, each of the color modifiers i, j, k, need not be modified. In other words, it may be desirable to alter only two of the base color modifiers, i, j, k, or even only one of them. Thus, in some embodiments, only one of the color modifiers i, j, k, may be adjusted. While such adjustment or modification may limit any noticeable change in a modified file by an observer, it may carry risk. For example, some shellcodes may be encoded in only certain data unit bits that represent a certain color of the base colors RGB. Thus, an embodiment that adjusts only the j modifier, for example, may be ineffective against a shellcode encoded in the i or k representative bits of the data unit, for example.

For this reason, it may be desirable in the example embodiments to determine not only the portion of data units in a random-like manner, but also to adjust the data unit values in a random-like manner as well. Such an embodiment may prevent the crafty hacker form cleverly developing a shellcode to account for a systematic modification of an input file.

Process 300 has many goals, one being a high probability of disarming encoded shellcode without knowing its location (e.g., the encoded data units) in an input file and/or its size (e.g. length or number of encoded data units). Thus, an example embodiment aims to adjust a data unit value of as many data units as practicable. It may be preferred from a security viewpoint, for example, to adjust the value of each data unit of an input file (e.g., the value of all of the pixels of an image file), yet, this may cause a noticeable, undesirable and/or unacceptable change to the input file. A modified file may include a modified image, for example, that may be unacceptable for its intended use when presented to a user for example. Unacceptability may be determined objectively based on a comparison of an image of the original input file, for example. Accordingly, it may be desirable to adjust only some or a portion of data units of the input file. However, in some example embodiments unacceptability of a modified file for an intended use may not depend on an objective comparison of the input file and a modified file. This is because subtle changes can be made to input content that although may be noticeable in a side by side comparison, will not interfere with the intended use of the input content.

In the example embodiments, in order to address a concern of an undesirable or unacceptable modification of an input file, it may be advantageous to apply a minimal possible modification adjustment to the data unit value, e.g., the digital representation of a pixel value, for each data unit determined in operation 304, which in some embodiments may include each data unit of the input file. For example, assuming a pixel Pix(i,j) in location (i, j) is represented by the digital value of its R, G, B base colors so that $Pix_{(i,j)} = (r_{(i,j)}, g_{(i,j)}, b_{(i,j)})$, a minimal change of the color representation value may be applied to all of the image pixels, so that for an image of the size M×N every pixel $Pix_{(i,j)}\{0<i<M-1; 0 \leq j \leq N-1\}$ the original pixel colors values may be changed as follows:

$$[r_{(i,j)}, g_{(i,j)}, b_{(i,j)}] \Rightarrow [r_{(i,j)} \pm 1, g_{(i,j)} \pm 1, b_{(i,j)} \pm 1]$$

For a graphical representation of 8 bits per color, the above adjustment format will change the combined color value by 1/256 of the entire intensity range of each base color. For some images of an input file, such small amount of modification may not be noticeable when the image of a modified file is presented to a user. Such change of the colors of the data units of the entire input file is likely to be much smaller than the difference between the way an image is presented on a first display device and the way the same image is presented on another display device, merely due to the difference in the representation of a certain pixel on the two different display devices when their digital value is the same. Moreover, the example modification may be less noticeable than modifications applied to only some pixels, because the modification to the entire image does not contain 'singular' locations in the image since a data unit value of all of the pixels are adjusted.

Thus, according to some embodiments, in order to ensure that at least one byte of any shellcode in an input image file, if present, will be changed and thus the shellcode will be disarmed, it may be preferred to modify each or substantially all of the data units of the input image file. Additionally, in order to minimize a magnitude of perceptible change of an image of a modified input file, the magnitude of change to be applied to each data unit or pixels may be ±1.

Figures 5A, 5B:
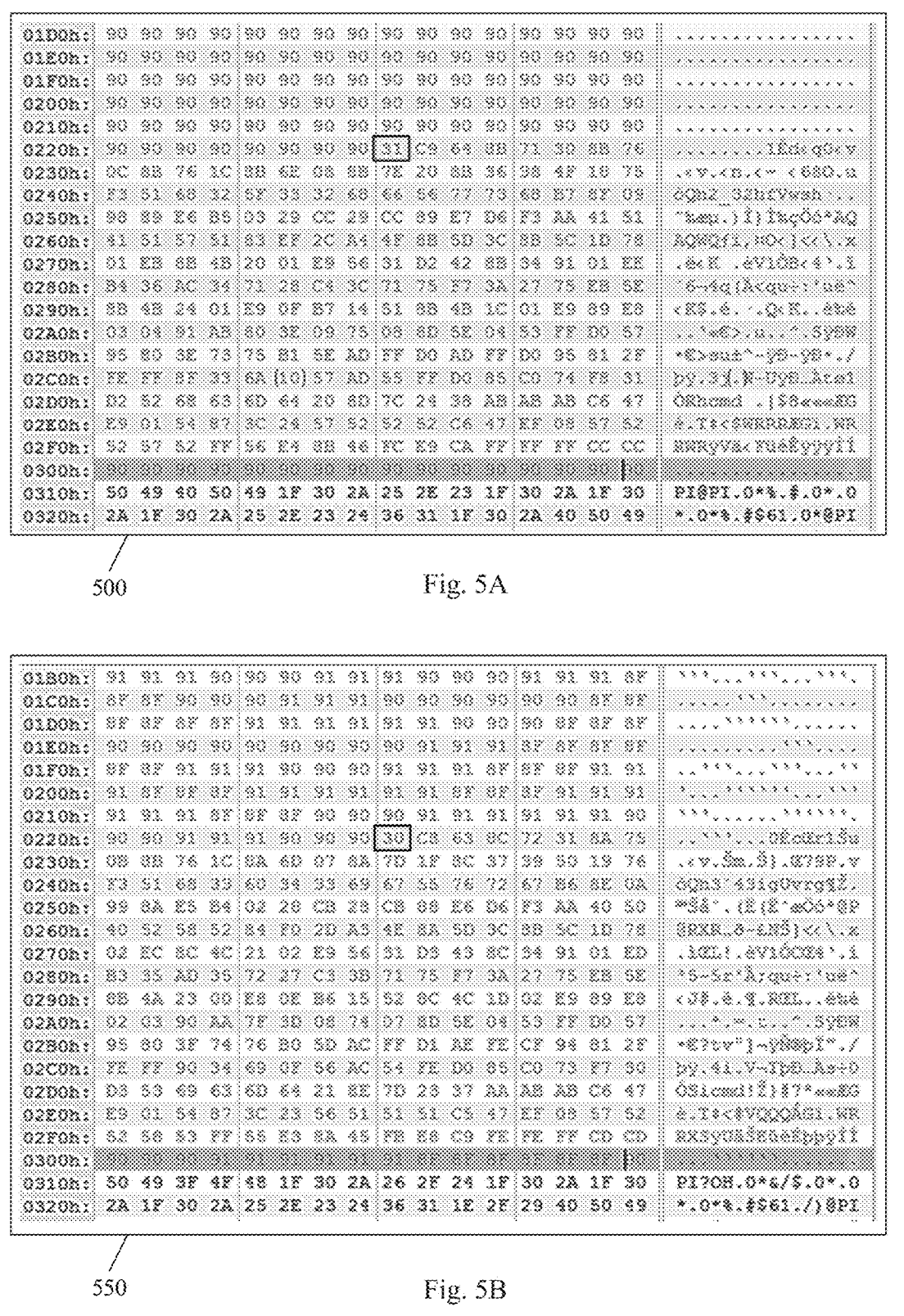

Reference is made now to FIGS. 5A and 5B, which illustrate a hexadecimal dump 500 of a section of an input image file including shellcode embedded in the input file shown in FIG. 4A, and a hexadecimal dump 550 of the same file section after the shellcode has been disarmed according to an example process 300, respectively. As can be seen, in FIG. 5A, the image 400 of FIG. 4A contains shellcode embedded in positions 0x0030 to 0x030f. Following processing of an input file according to the example embodiments, the data units of a modified file may have been altered as shown in FIG. 5B. As can be seen in the hexadecimal dump 550 of FIG. 5B, the data unit value of the encoded shellcode content in positions 0x0030 to 0x030f has been altered, thereby disarming the encoded shellcode. In this embodiment, up to 80% of the data units e.g., pixels of the input file were selected at random. As shown in the file section 500 of FIG. 5A, the encoded shellcode starts at address 0229h. One may notice that the contents, e.g., data unit value, of the locations following address 0229h was changed at least by value of 1. For example, at address 0229h the value "31" in FIG. 5A (encircled in a rectangular) was changed to "30" in FIG. 5B. And at address 022Ah the value "C9" in FIG. 5A was changed to C8 in FIG. 5B, etc.

It should be noted that the example embodiments may be applied to any input file where the judgement of the integrity of its content allows a certain level of deviation from the original content without substantially deteriorating the overall appearance or perceptibility of that content when it is browsed or played, for example, or deteriorating the conception or preventing the usability of it by a user. Thus, for example, example embodiments described above with respect to an image file may be applied to files of other types of media content such as audio files or video files (including streaming content), and or other files including non-media content. For these embodiments, an example process 300 may be applied in keeping with the principle that the content (e.g., digital representation of audio tones) of an input file may be altered or modified sufficiently to provide adequate certainty that any embedded shellcode may be disarmed, while maintaining a user-perceptible quality of the played modified file as high as possible, so as not to prevent or interfere with an intended use of the content of the input file.

Reference is now made to FIGS. 6A and 6B depicting partial disassembled output 600 of the input file of the image shown in FIG. 4A, which contains embedded shellcode, and a partial disassembled output 650 of the modified file of the modified image presented in FIG. 4B. As can be seen, the partial disassembled output 650 of FIG. 6B indicates a change of the machine code of the encoded shellcode, in a modified file created by example process 300. In the examples of FIGS. 6A and 6B, the input file and modified file were disassembled using Online Disassemble Tool of DISASSEMBLER.IO. The line marked "A" in the depiction of disassembled code in FIG. 6A contains the assembly language operator 'jne' (meaning jump if not equal) and the operand (jump address) 'location 00000014'. The same location in the modified file, presented in FIG. 6B and marked "A1" contains the assembly language operator 'jbe' (meaning jump if below or equal) and the operand was changed to 'location 0000009e'. One of ordinary skill in the art would understand that due to this change in the modified file, the original program line of the shellcode, as modified according the example embodiments, has a completely different affect on operation of the shellcode that prevents its intended effect. Similarly, the line marked "B" in the print of disassembled code in FIG. 6A contains the assembly language operator 'rep' and the operand 'stos'. The same location in the modified file, presented in FIG. 6B and marked "B1" contains the assembly language operator movs' and a "BYTE PTR". Here also due to this change in the original program line of the shellcode in the modified file, as modified according to the example embodiments, has a completely different effect on operation of the shellcode that prevents its intended effect.

As explained with respect to the image file example above, modification of data units of an input file containing image data according to the example embodiments may result in a modified file including a modified digital representation of the original image in which the modification is not likely to be perceived by most average viewers, yet may be sufficient to disarm shellcode encoded in the data units of the original input file.

In the example embodiments, a computer program adapted to perform the steps and operations according to example process 300, depicted for example in FIG. 4, may be stored in a non-transitory storage medium, such as memory 210A (FIG. 2). The computer program may be configured such that when it is executed by a processor, such as processor 210 (FIG. 2) of a computing system 200, wherever situated in the computing environment 100, it enables the processor to perform aspects of the example process 300 for modifying input content to disarm any shellcode that may be encoded in the input content. As described above, the example process 300 may be performed by any computing component or system of components in computing environment 100 for modifying an input content or an input file at one or more nodes in network 110. In some embodiments, example process 300 may be performed on any input content entering network 110 (e.g., via e-mail, download, upload or file transfer etc.), whether via network 150 or on a local host computer 120, for example. In some embodiments, example process 300 may be performed by a computing element of cloud server 165, for example, to disarm any malicious code included in content uploaded to the cloud server 165, for storage for example.

One of ordinary skill in the art would understand that the example embodiments described above pertaining to an image file are by example only. The example embodiments described above for disarming shellcode embedded in an input image file may be similarly applied for disarming shellcode embedded in input audio file or input video file, or other input file types, with necessary changes for processing the different input file types. For example, an input audio file sampled at 44,100 Hz rate and 24-bit sampling depth contains 44,100 samples at 24-bit resolution for each second of the sampled audio. Modifying an input audio file that may contain encoded shellcode, according to the example process 300, may be similarly performed for the data units (e.g., audio samples) of the input audio file. In some embodiments, for example, a data unit value of some or each audio sample of the input audio file may be altered by a binary value of "1." Such an alteration will change the tone represented by that data unit value by less than 1/8,000,000 of the original tone. Such a change is not likely to be noticeable to a listener of the modified file.

While certain features of the example embodiments have been illustrated and described herein, many modifications, substitutions, changes, and equivalents will be apparent to those of ordinary skill in the art. It is, therefore, to be understood that the appended claims are intended to cover all such modifications and changes as fall within the true spirit of the invention.

What is claimed is:

1. A method for disarming malicious code in a computer system having a processor, the method comprising:
   accessing, by the computer system, input content, wherein the input content includes a plurality of data units having a value; and
   automatically adjusting, by the processor if a signature-based malware detection algorithm does not detect malicious code in the input content, a data unit value of at least a portion of the data units to render any undetected malicious code included in the plurality of data units inactive for its intended malicious purpose while not interfering with an intended use of the input content, wherein a location of data units including any undetected malicious code is not known.

2. The method of claim 1, further comprising outputting a new content including each adjusted data unit value in place of a respective data unit value of the input content.

3. The method of claim 2, further comprising applying a malware detection algorithm to the new content, thereby confirming any malicious code included in the input content was rendered inactive for its intended malicious purpose.

4. The method of claim 3, wherein the malware detection algorithm applied to the new content includes a behavior-based malware detection algorithm.

5. The method of claim 1, wherein the portion of the data units is randomly or pseudo-randomly selected from the plurality of data units.

6. The method of claim 1, wherein at least one of the portion of data units and an adjustment of a data value is determined so as not to interfere with an intended use of the input content.

7. The method of claim 6, wherein the plurality of data units includes each data unit corresponding to media content of the input content, and wherein the portion of the data units is randomly selected from the plurality of data units, the portion including at least .1% of the plurality of data units but not more than 2% of the plurality of data units.

8. The method of claim 6, wherein at least one of the portion of data units and an adjustment of a data value is determined based on a type of the media content.

9. The method of claim 1, wherein the data unit value is variably adjusted by a binary value of one.

10. The method of claim 1, further comprising, determining, based on a characteristic associated with the input content, whether the input content is suspicious, wherein the adjusting is performed if the input content is suspicious.

11. The method of claim 1, wherein the computer system includes an edge computing device of a network for receiving the input content in an electronic communication received from outside the network.

12. The method of claim 11, further comprising:
   outputting a new content including each adjusted data unit value in place of a respective data unit value of the input content; and
   forwarding the new content to a computing device of an intended recipient of the input content.

13. A non-transitory computer-readable medium storing instructions that, when executed by a processor, cause the processor to perform operations for disarming malicious code in a computer system, the operations comprising:
   accessing input content, wherein the input content includes a plurality of data units having a value; and
   responsive to an applied malware detection algorithm not first detecting suspected malicious content or suspicious content in the input content, adjusting a data unit value of at least a portion of the data units to render any undetected malicious code included in the plurality of data units inactive for its intended malicious purpose while not interfering with an intended use of the input content, wherein a degree of the adjustment is variable among the portion of the data units.

14. The non-transitory computer-readable medium of claim 13, the operations further comprising outputting a new content including each adjusted data unit value in place of a respective data unit value of the input content.

15. The non-transitory computer-readable medium of claim 14, the operations further comprising applying a behavior-based malware detection algorithm to the new content, thereby confirming any malicious code included in the input content was rendered inactive for its intended malicious purpose.

16. The non-transitory computer-readable medium of claim 15, further comprising forwarding the new content to a computing device of an intended recipient of the input content.

17. A system for disarming malicious code, the system comprising:
    means for accessing input content, wherein the input content includes a plurality of data units having a value; and
    responsive to an applied malware detection algorithm not first detecting suspected malicious content or suspicious content in the input content, means for adjusting a data unit value of at least a portion of the data units to render any undetected malicious code included in the plurality of data units inactive for its intended malicious purpose while not interfering with an intended use of the input content.

18. The system of claim 17, further comprising means for variably adjusting a data unit value of at least a portion of the data units.

19. The system of claim 17 further comprising means for outputting a new content including each adjusted data unit value in place of a respective data unit value of the input content.

20. The system of claim 19, wherein the system includes an edge computing device of a network for receiving the input content in an electronic communication received from outside the network, and means for forwarding the new content to a computing device of an intended recipient of the input content.

21. The system of claim 17, further comprising means for determining the portion of the data units based on a random or pseudo-random selection of data units from the plurality of data units.

* * * * *